United States Patent
Bogart

(10) Patent No.: US 9,278,566 B2
(45) Date of Patent: Mar. 8, 2016

(54) SYSTEM AND PROCESS FOR AUTOMATIC PRINT HEAD REGISTRATION OF A DIGITAL PRINTING MACHINE

(71) Applicant: Mitchell J. Bogart, Sharon, MA (US)

(72) Inventor: Mitchell J. Bogart, Sharon, MA (US)

(73) Assignee: Scale Abilities LLC, Sharon, MA (US)

( * ) Notice: Subject to any disclaimer, the term of this patent is extended or adjusted under 35 U.S.C. 154(b) by 0 days.

(21) Appl. No.: 14/586,931

(22) Filed: Dec. 30, 2014

(65) Prior Publication Data

US 2015/0174934 A1    Jun. 25, 2015

Related U.S. Application Data

(60) Provisional application No. 61/922,854, filed on Jan. 1, 2014.

(51) Int. Cl.
*B41J 29/393* (2006.01)
*B41J 2/21* (2006.01)
*H04N 1/00* (2006.01)

(52) U.S. Cl.
CPC .............. *B41J 29/393* (2013.01); *B41J 2/2135* (2013.01); *H04N 1/00* (2013.01)

(58) Field of Classification Search
CPC .... B41J 29/393; B41J 2/04505; B41J 2/2132; B41J 2/2135; B41J 2/2146; B41J 11/008; B41J 11/20; B41J 11/42; B41J 11/46

USPC .......................................................... 347/19
See application file for complete search history.

(56) References Cited

U.S. PATENT DOCUMENTS

| | | | | |
|---|---|---|---|---|
| 6,076,915 A | * | 6/2000 | Gast et al. | 347/19 |
| 2011/0043864 A1 | * | 2/2011 | Tian et al. | 358/3.26 |
| 2011/0074861 A1 | * | 3/2011 | Saettel et al. | 347/19 |

* cited by examiner

*Primary Examiner* — Geoffrey Mruk
*Assistant Examiner* — Scott A Richmond
(74) *Attorney, Agent, or Firm* — Steven N. Fox, Esq.

(57) ABSTRACT

A process for measuring the amount of mis-registration between first and second print heads of a digital printing machine and adjusting the print data sent to the machine. The process comprises a step of printing a calibration test page comprising overlapping registration targets created by the first and second print heads. The overlapping registration targets each comprise a target region comprising X and Y co-ordinates. The process further comprises a step of scanning the calibration test page to produce a bitmap image. The process further comprises a step of processing the bitmap image to produce a mis-registration score for each target region. The process further comprises a step of producing X and Y registration correction amounts for the second print head based upon the mis-registration scores. The process further comprises a step of adjusting the print data to the second printhead based upon the X and Y registration correction amounts.

5 Claims, 25 Drawing Sheets

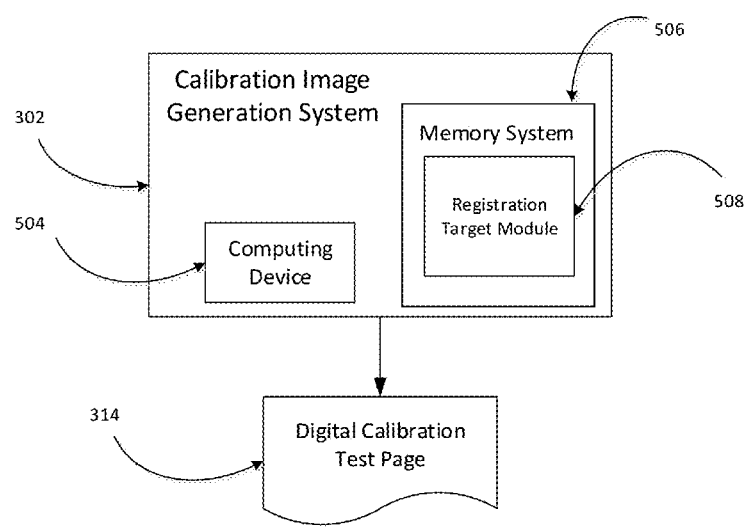
FIG. 5A
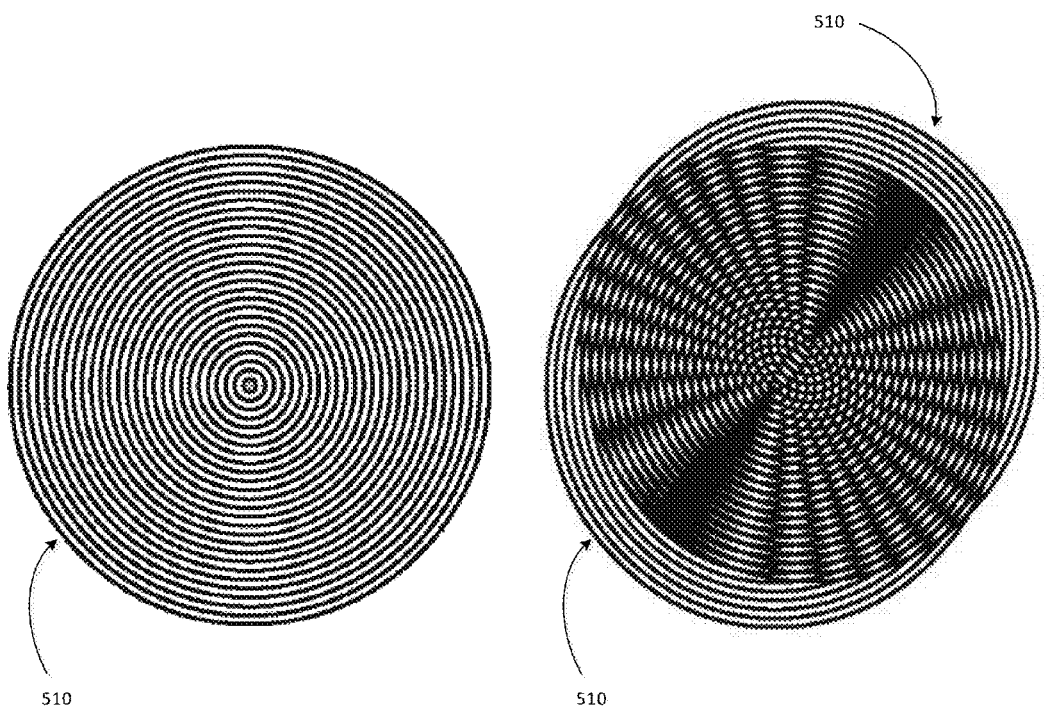
FIG. 5B                    FIG. 5C

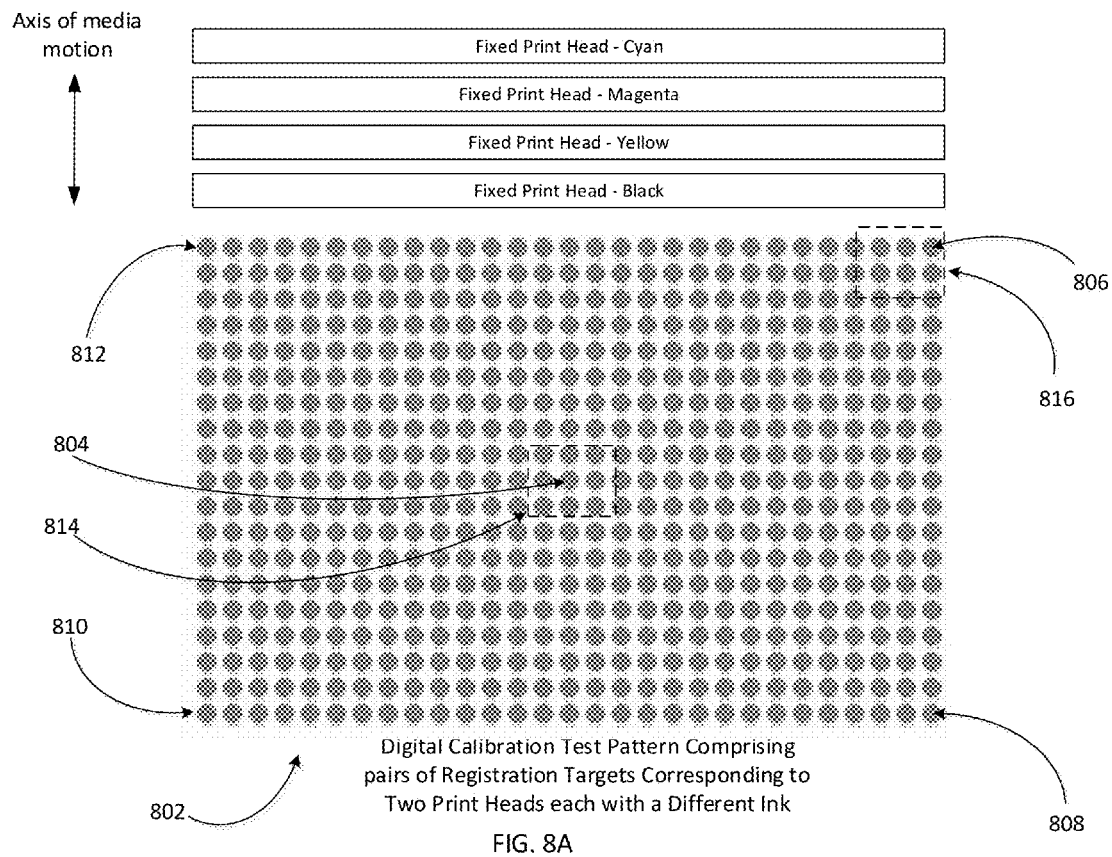
FIG. 8A
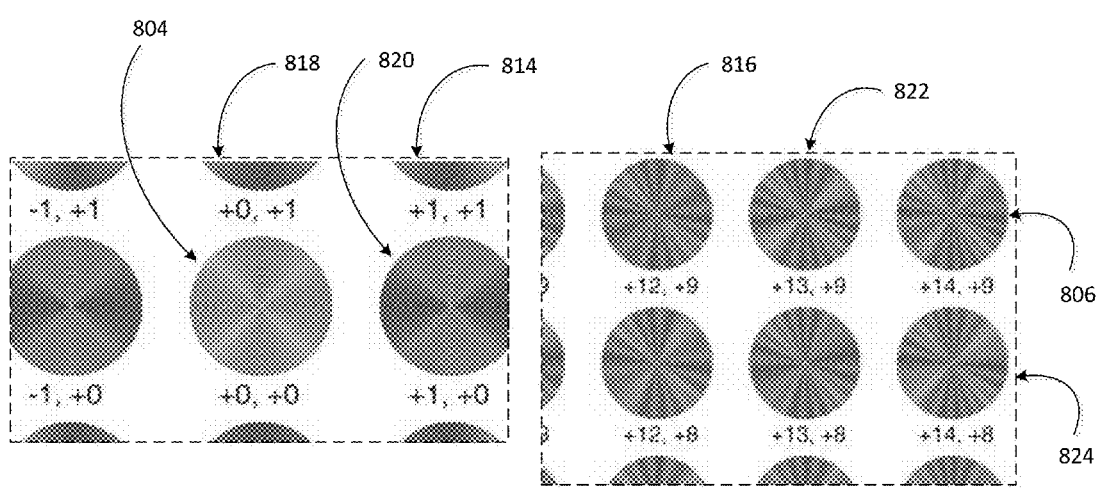
FIG. 8B
FIG. 8C

1102

Calculation of registration correction amounts for a single pair of print heads

Processing description – Line by line copying or generation of screened data from a point in the source region to a point in the destination region. Starting points have offsets based on the registration correction amounts.

Registration mark pairs for registration of 2 print heads printing the same ink for reasons of speed or clogged nozzle redundancy Patterns are for one ink at a time Single Computer Configuration

SYSTEM AND PROCESS FOR AUTOMATIC PRINT HEAD REGISTRATION OF A DIGITAL PRINTING MACHINE

CROSS-REFERENCE TO RELATED APPLICATIONS

This application claims priority to U.S. Provisional Application Ser. No. 61/922,854 filed on Jan. 1, 2014, now pending, which is hereby incorporated into this specification by reference in its entirety.

BACKGROUND OF THE INVENTION

Referring to FIGS. 1-2, a conventional off-set or digital printing system 100 using imaged metal plates or print heads generally includes a ripping system 102, a printing system 104, a scanning system 106, and a physical re-positioning system 108. Multiple ink printing involves the step of aligning the printing of each ink on the paper so they overlap as perfectly as possible, typically to within a thousandth of an inch. On printing system 100, registration is done by repositioning the individual imaged metal plates mounted on cylinders for each ink with respect to each other or the print heads for a digital printing machine. As shown in FIG. 2, as indicated by a block 202, system 100 comprises code to print a page having special vertical and horizontal registration targets suitable for use with special purpose high resolution cameras. As indicated by a block 204, system 100 comprises code to scan the registration targets using a high resolution camera to take digital images of the registration marks which ideally should overlap perfectly. Any shift between inks or separations will be shown by and included within the digital image to within a thousandth of an inch. As indicated by a block 206, system 100 comprises code to determine whether any correction of the print heads is needed. If no correction is needed, control is passed to a block 208 where system 100 ends this cycle of operation and waits for the next calibration cycle or request. If correction is needed, control is passed to a block 210 where system 100 comprises code to physically adjust the imaged metal plates by converting the mis-registration amounts into commands to the press hardware in order to reposition the imaged metal plates and/or change data timing so that the same print data will print differently. Control is then returned to block 202 where the cycle is repeated as frequently as necessary or desired. Digital printing presses, unlike traditional offset printing using imaged metal plates, have the unique ability to print every copy differently by sending different data to the print heads for each printing impression. To compensate for mis-registration, conventional digital printing presses physically adjust the position of the print heads for each ink and/or the relative timings of the print signals to the print head are adjusted. Subsequently, when the exact same print data is sent to the digital imaging machine, the registration of inks or separations appearing on the substrate is different and more accurate. However, physical movement of the print heads creates many problems, including down time of the printing press.

SUMMARY OF THE INVENTION

One object of the present invention was to develop a printing system that could automatically measure and adjust the print data for any mis-registration between print heads without physically moving and/or replacing any print heads.

The present invention is a system and process for measuring the amount of mis-registration between first and second print heads of a digital printing machine and adjusting the print data sent to the digital printing machine based upon the amount of correction needed. The process comprises a step of printing a calibration test page comprising a plurality of overlapping registration targets created by the first and second print heads. Each of the overlapping registration targets comprise a target region comprising X and Y co-ordinates. The process further comprises a step of scanning the calibration test page to produce a bitmap image. The process further comprises a step of processing the bitmap image to produce a mis-registration score for each of the target regions. The process further comprises a step of producing X and Y registration correction amounts for the second print head based upon the mis-registration scores. The process further comprises a step of adjusting the print data to the second printhead based upon the X and Y registration correction amounts.

BRIEF DESCRIPTION OF THE DRAWINGS

The following description of the invention will be further understood with reference to the accompanying drawings, in which:

FIG. 5A is a high level block diagram showing the calibration image generation system according to the present invention.

FIG. 5B illustrates a registration target generated by the calibration image generation system having a having a line width and spacing of six (6) pixels.

FIG. 5C illustrates a pair of mis-registered registration targets having a line width and spacing of six (6) pixels showing a pronounced moire pattern.

FIG. 8A illustrates a digital calibration test pattern generated by the calibration image generation system comprising a plurality of pairs of registration targets. Digital calibration test patterns may be placed anywhere on a digital calibration page or on one or more borders of a page to be printed. This pattern will provide corrections for mis-registration between magenta and black as large as +/−14 pixels in the X direction and +/−9 pixels in the Y direction.

FIG. 8B is an enlarged view of a central portion of the digital calibration test pattern of FIG. 8A at co-ordinates 0, 0 where there is no mis-registration.

FIG. 8C is an enlarged view of the top right portion of the digital calibration test pattern of FIG. 8A at co-ordinate +14, +9, where there is maximum mis-registration.

DESCRIPTION OF THE INVENTION

The present invention provides an alternative approach to registration. Rather than reposition the physical print heads, the physical and electrical arrangement of the heads is left unchanged and it is the print data which is modified to bring printing into registration. This feature provides a significant improvement over conventional off-set and digital printing systems by saving downtime of the printing machine.

Figure 1:
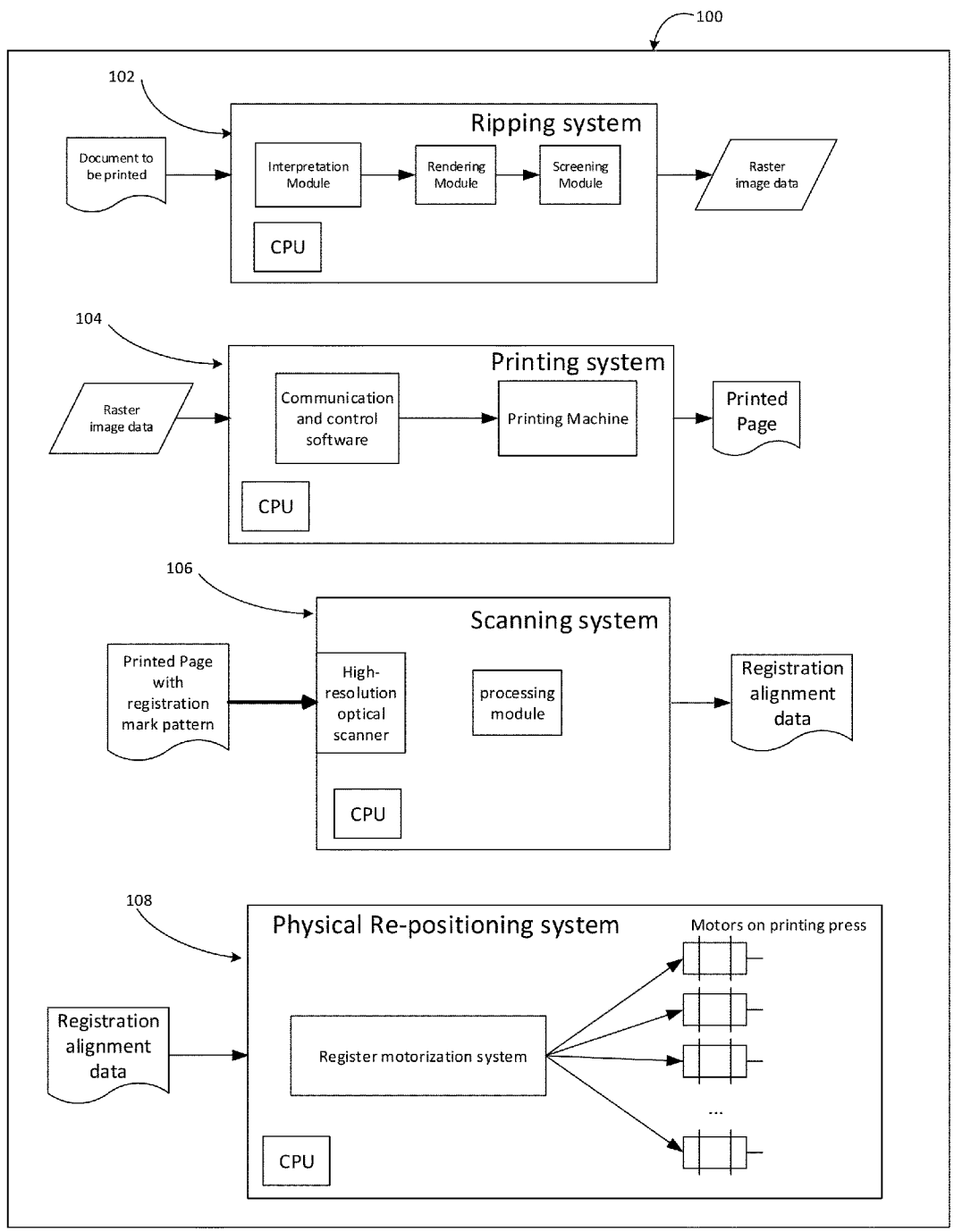
FIG. 1 is a high level block diagram showing a conventional offset or digital printing system comprising a ripping system, a printing system, a scanning system, and a physical re-positioning system.
Figure 2:
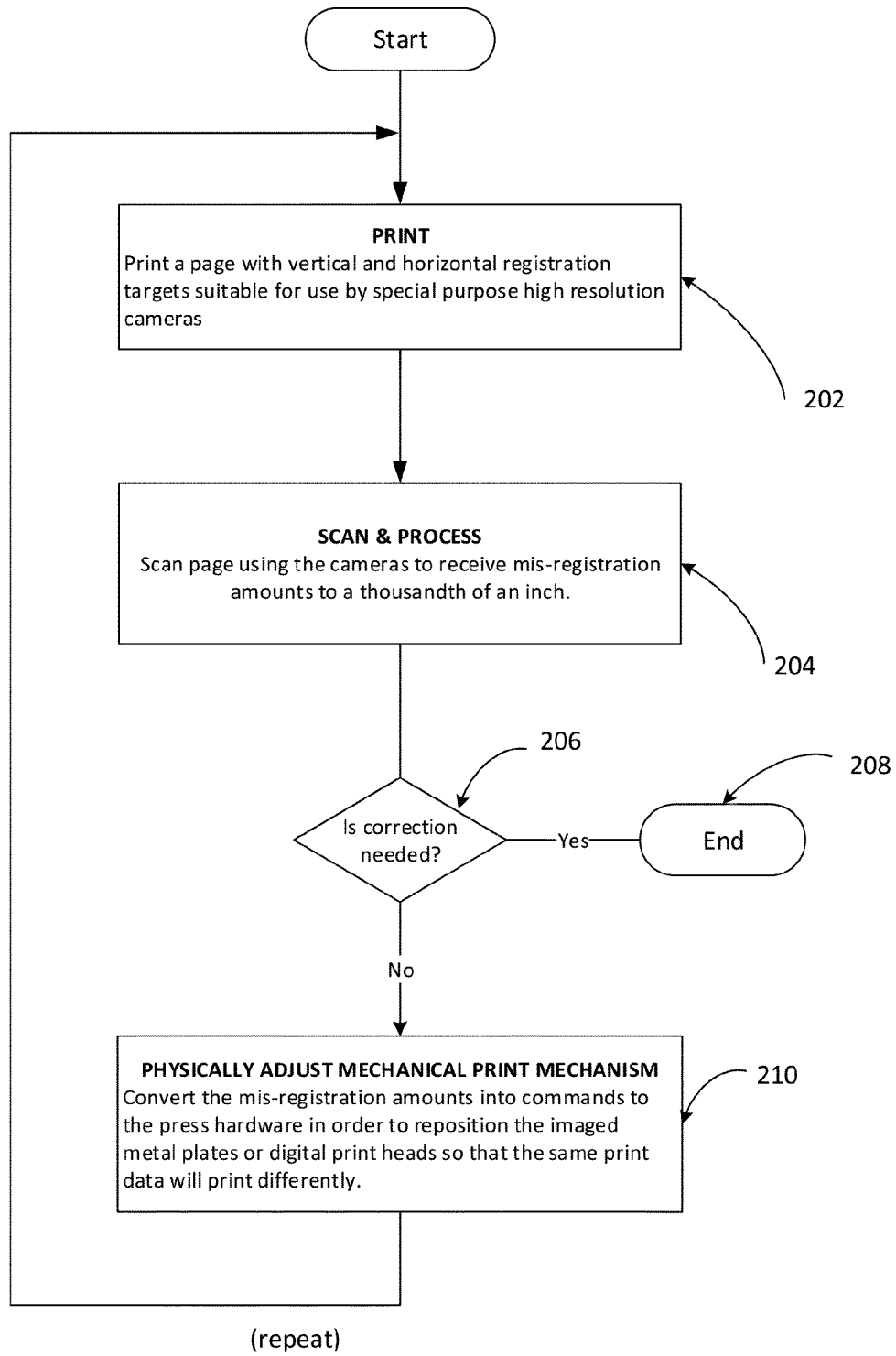
FIG. 2 is a high level flow chart showing a process used by a conventional printing system (offset or digital) to determine the amount of mis-registration between imaged separations and to physically adjust the position of the imaged metal plates or digital print heads by motors.
Figure 3:
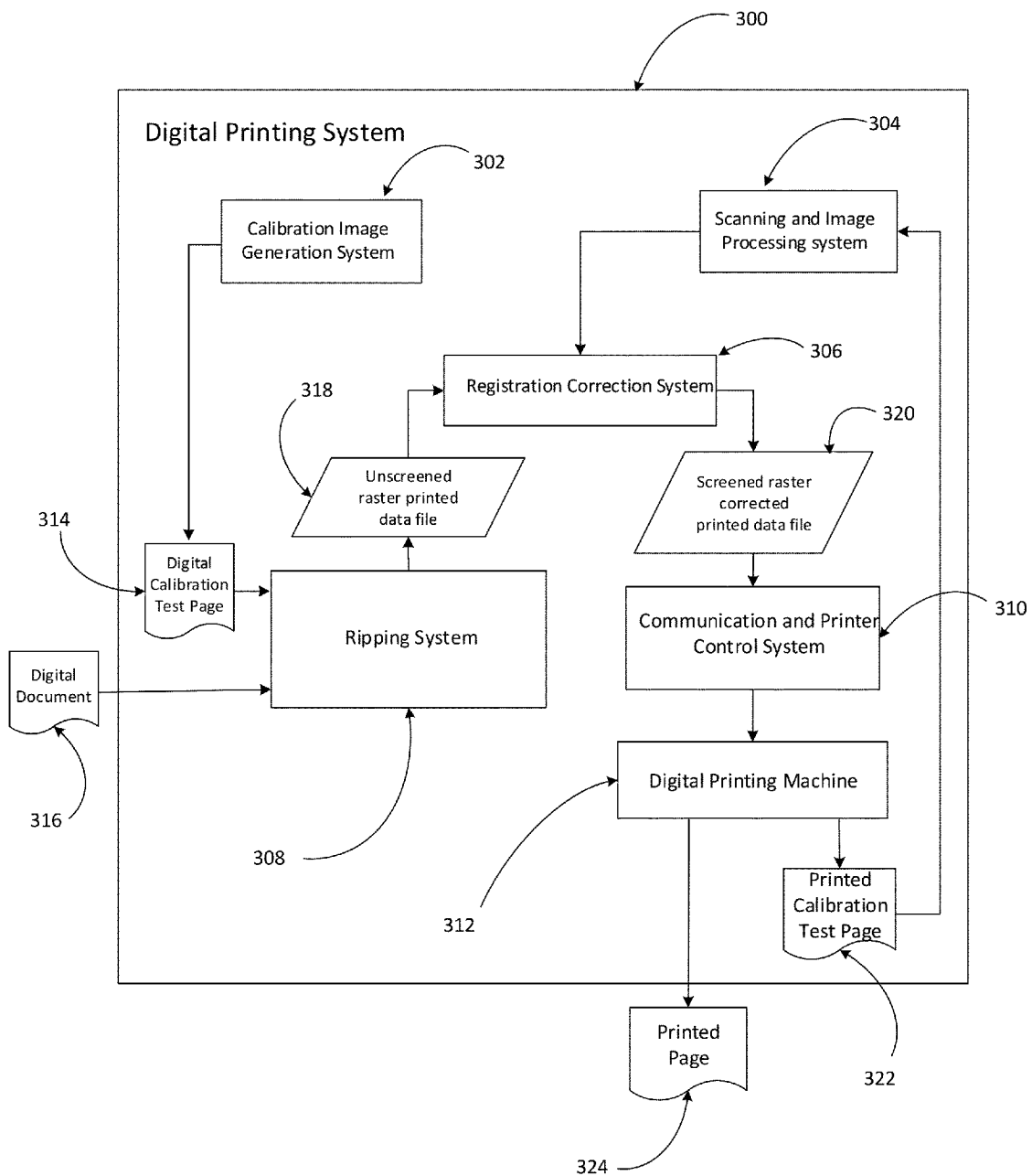
FIG. 3 is a high level block diagram showing a digital printing system according to the present invention.

Referring to FIG. 3, a digital printing system 300 according to the present invention generally comprises a calibration image generation system 302, a scanning and image processing system 304, a registration correction system 306, a ripping system 308, a communication and printer control system 310, and a digital printing machine 312. System 302 generally comprises hardware and software configured to create a calibration test page 314 that is processed by a ripping system 308 to produce an unscreened raster data file 318 of calibration test page 314. Unscreened raster data file 318 is input to a registration correction system 306 that, in the case of processing calibration test page 314, only screens unscreened raster data file 318 to output a screened raster corrected printed data file 320 that is input to system 310 that generally comprises hardware and software configured to output control signals to digital printing machine 312 to produce a printed calibration test page 322. System 304 generally comprises hardware and software configured to produce an electronic image (not shown) of printed calibration test page 322. System 306 generally comprises hardware and software configured to process the scanned image to determine the amounts of mis-registration between two (2) print heads (not shown) of digital printing machine 312 to produce a screened raster corrected printed data file 320 to system 310. During a run mode, when a digital document 316 is processed by system 300, an unscreened raster data file 318 from system 308 corresponding to digital document 316 is input to and corrected by system 306 producing corrected printed data file 320 that is input to system 310 that in turn outputs control signals to digital printing machine 312 producing a printed page 324.

System 300 provides an accurate and precise way to automatically detect the amounts of registration or adjustment needed. System 300 also corrects the printed data file in a manner fast enough to keep up with printing thereby making for a viable printing press product. As will also be described, system 300 provides the ability to correct for mis-registration between print heads printing the same ink. This is done for various reasons, the most common three being: multiple print heads are positioned adjacent to each other across the paper width in order to cover the full paper width; two or more print heads may be positioned displaced in the paper moving direction, sharing the printing in order to double or further increase the printing speed; a second print head may be positioned displaced in the paper moving direction to provide a redundant set of printing nozzles, to be used as alternates to cover for clogged nozzles. System 300 provides a process of automatically aligning the output from less-than-perfectly placed print heads with only using software leading to significant advantages over conventional printing systems. First, the printing press mechanical hardware is simplified and less expensive. Fewer mechanical positioning motors and mechanisms are required. Second, electrical hardware costs are reduced. Expensive precision high resolution cameras are not needed. Rather, inexpensive lower resolution cameras can be used. Third, print head positioning after replacement, though required, is less critical. Fine adjustment is done by the software and drive electronics. Fourth, the need for time-consuming and thus expensive manual re-alignments of the print heads is reduced or eliminated. Fifth, precision and accuracy are both excellent. System 300 provides the optimal correction to within plus or minus one half the width of a device pixel. For a 1200 dpi device, this means accuracy and precision of +/−0.00042 inch, less than half a thousandth of an inch. Sixth, operation of system 300 can be made fully automatic. Human interaction is not necessary. Seventh, calculation of optimal registration corrections is fast due to use of special registration patterns according to the present invention (to be described). These registration patterns may be printed using a whole "calibration" page, or only in margin area. They may even span multiple pages if needed. Both the scanning and the imaging processing power needed are relatively small and low cost. Eighth, the process of shifting the print data, which could otherwise be prohibitively slow, is easily done in a scalable manner utilizing GPU acceleration. The algorithm is simple and its scalability means it can be easily made as fast as the copy rate itself, if desired. The term print head means a collection of printing nozzles organized in a linear array and generally manufactured together as one. For example an 8 inch wide, 1200 dot per inch print head would have an array of 9600 ink nozzles. The term print bar means a set of adjacent print heads having that print the same inks. For example, a 40 inch print bar might consist of five 8 inch print heads horizontally adjacent to each other, printing 48,000 consecutive dots.

Figure 4:
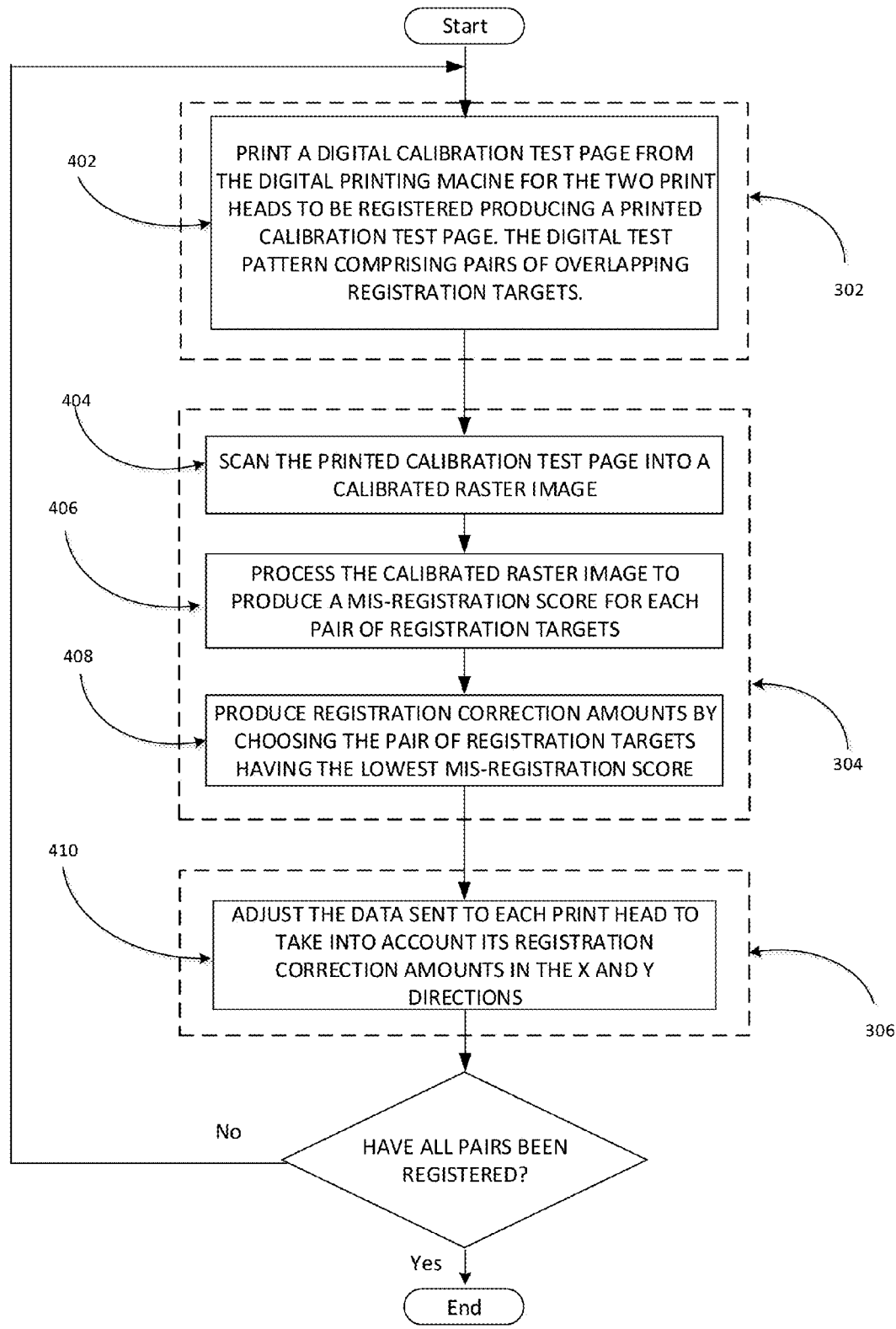
FIG. 4 is a high level flow chart showing the process of the digital printing system according to the present invention comprising a calibration image generation system, a scanning and image processing system, a scanning and image processing system, a ripping system, a registration correction system, a communication and printer control system, and a digital printing machine.

Referring to FIG. 4, a process for operating system 300 according to the present invention is shown and described. As shown by a step 402, system 302 is configured to print a printed calibration test page comprising pairs of overlapped registration targets for the two print heads to be registered. As will be described more fully herein, each registration target comprises concentric circles and each pair of registration targets comprise a unique built-in registration off-set and a target pair region. The range of registration off-sets should be large enough to cover the largest anticipated mis-registration horizontally and vertically. As shown by a step 404, system 304 is configured to scan the printed calibration test page to produce a calibrated raster image. As will be described more fully herein, a low resolution optical scanner or camera may be used rather than a conventional high resolution scanner or camera. As shown by a step 406, system 304 is configured to process the calibrated raster image to produce a mis-registration score for each pair of registration targets. As will be described more fully herein, system 304 is configured to produce the mis-registration score for each pair of registration targets by converting any colored pixels of the calibrated raster image to grayscale (Black); blurring the calibrated raster image; and thresholding the calibrated raster image to produce a 1-bit image. As shown by a step 408, system 304 is further configured to produce a mis-registration score for each pair of registration targets by choosing the pair of registration targets having the lowest mis-registration score. As will be described more fully herein, the lowest mis-registration score is determined by totaling the number of dark pixels in each target region and selecting the pair of registration targets with the lightest image or value. As indicated by a step 410, system 306 is configured to adjust the data sent to each print head to take into account its registration correction amounts. As will be described more fully herein, system 306 comprises a graphic processing unit (Computing device) to process the data. In the preferred embodiment pairs of print heads may be registered sequentially as follows: (1) assume one ink is correct, for example Black; (2) determine Cyan offset relative to Black; (3) determine Magenta offset relative to Black; and (4) determine Yellow offset relative to Black.

Referring to FIGS. 5A-5C, calibration image generation system 302 generally comprises a computing device 504, a memory system 506, and a registration target module 508 stored on memory system 506. As shown by FIG. 5B, module 508 comprises code to create a digital registration target 510 comprising a plurality of concentric circles. Digital registration target 510 is shown at a magnified size (a line thickness of 6 pixels and a line spacing of 6 pixels) for easier viewing. As shown by FIG. 5C, when two digital registration targets 510 are printed, one by each print head so as to overlap on a printed page, visible moiré patterns appear if and only if there is mis-registration between print heads.

The term computing device means any type of presently known or futurely developed computational processing device, including but not limited, to central processing units, microprocessors, and graphic processing units. The term memory system means any type of memory device capable of storing computer instructions or code. The term module means computer instructions or code that may be implemented in software or hardware. Such computer instructions or code may be programmed in any presently or futurely developed programming language such as C or C++ for most types of computing devices and CUDA® for NVIDIA® graphic processing units. One or more modules may be implemented as software stored on one or more memory systems or discrete circuit hardware directed connected with one or more computing devices and/or a digital printing machine.

Figure 6:
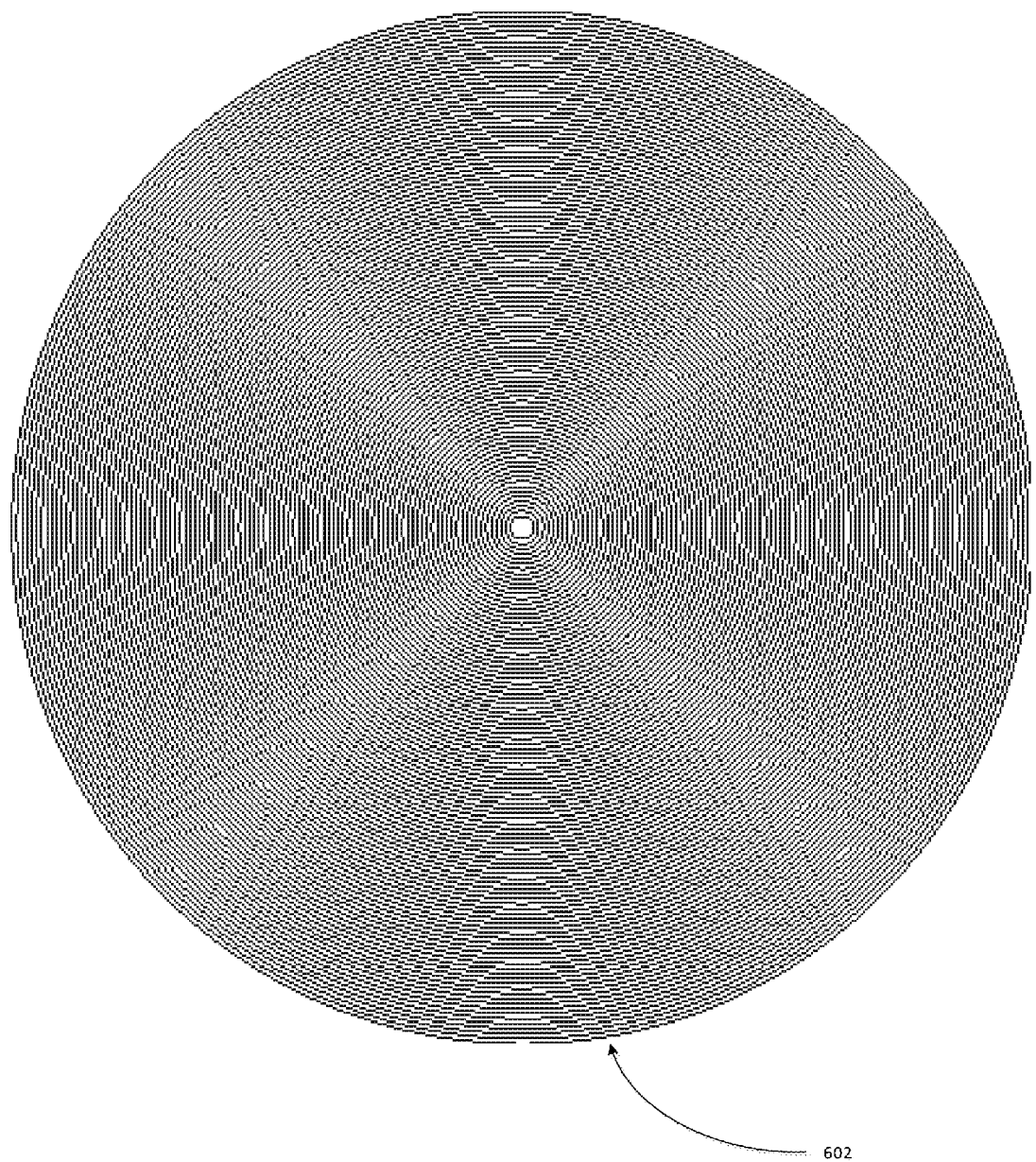
FIG. 6 illustrates a registration target having a line width and spacing of one (1) pixel.
Figure 7:
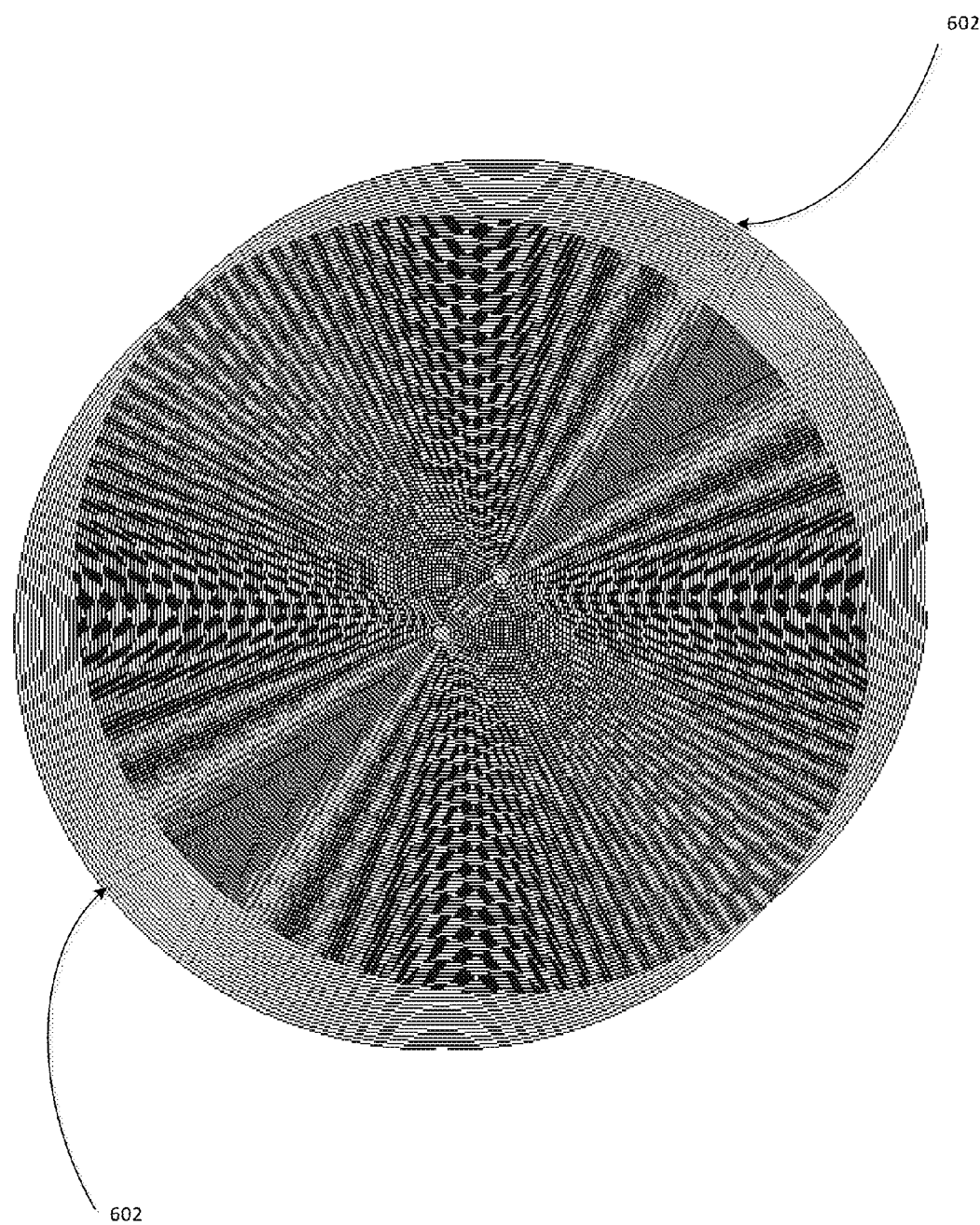
FIG. 7 illustrates a pair of mis-registered registration targets having a line width and spacing of one (1) pixel showing a pronounced moire pattern.

Referring to FIGS. 6 and 7, a digital registration target 602 comprises a plurality of concentric circles having a line thickness of one pixel and a line spacing of one pixel. As shown by FIG. 7, an overlapping pair of registration targets 602 displays visible moiré patterns when mis-registered.

Referring to FIGS. 8A-8C, a digital calibration test pattern 802 comprises a plurality of pairs of digital registration targets that may occupy either a whole printed page or specific areas by rows and columns, typically around the margins. A pair of registration targets 804 are located at X,Y coordinate 0,0 of pattern 802. Pairs of registration targets 806, 808, 810, and 812 are shown at the upper and lowermost rows and columns. A one pixel spacing is maintained between pairs of registration targets throughout digital calibration test pattern 802. For example, as shown in FIG. 8B, a pair of registration targets 818 are located at X,Y coordinate +1, 0, namely, one pixel above pair of registration targets 804 located at X,Y coordinate 0,0. Similarly, a pair of registration targets 820 are located at X,Y coordinate 0, +1, namely, one pixel to the right of pair of registration targets 804. By way of further example, as shown in FIG. 8C, a pair of registration targets 822 are located at X,Y coordinate +13, +9, namely, one pixel to the left of pair registration targets 806 located at X,Y coordinate +14, +9. Similarly, a pair of registration targets 824 are located at X,Y coordinate +14, +8, namely, one pixel below pair of registration targets 806. FIG. 8A thus shows all combinations of X and Y mis-registrations, with 1 pixel precision, for the ranges of +/−14 pixels in the X direction and +/−9 pixels in the Y direction. A significant benefit of using digital calibration test pattern 802 comprising pairs of registration targets is that for mis-registration in any direction, a large and darker set of moiré interference patterns results when the amount equal to or greater than just one line (or space) width. As described before, to achieve a precision to within one device pixel, each of the registration targets use a line thickness of one device pixel as well as a spacing between concentric circles equal to one device pixel. The amount of purposeful print overlap of pairs of registration targets throughout digital calibration test pattern 802 must be, at a minimum, the size of a computer scan-able registration mark, about one quarter to ⅜ths of an inch or more. The moiré patterns always include large regions that strongly appear darker than two perfectly overlapped targets. This is key to the image processing algorithm as will be described in connection with scanning and image processing system 304. The individual pixels are, of course, not darker at all as they are always either completely white (0% ink) or completely black (100%).

Figure 9:
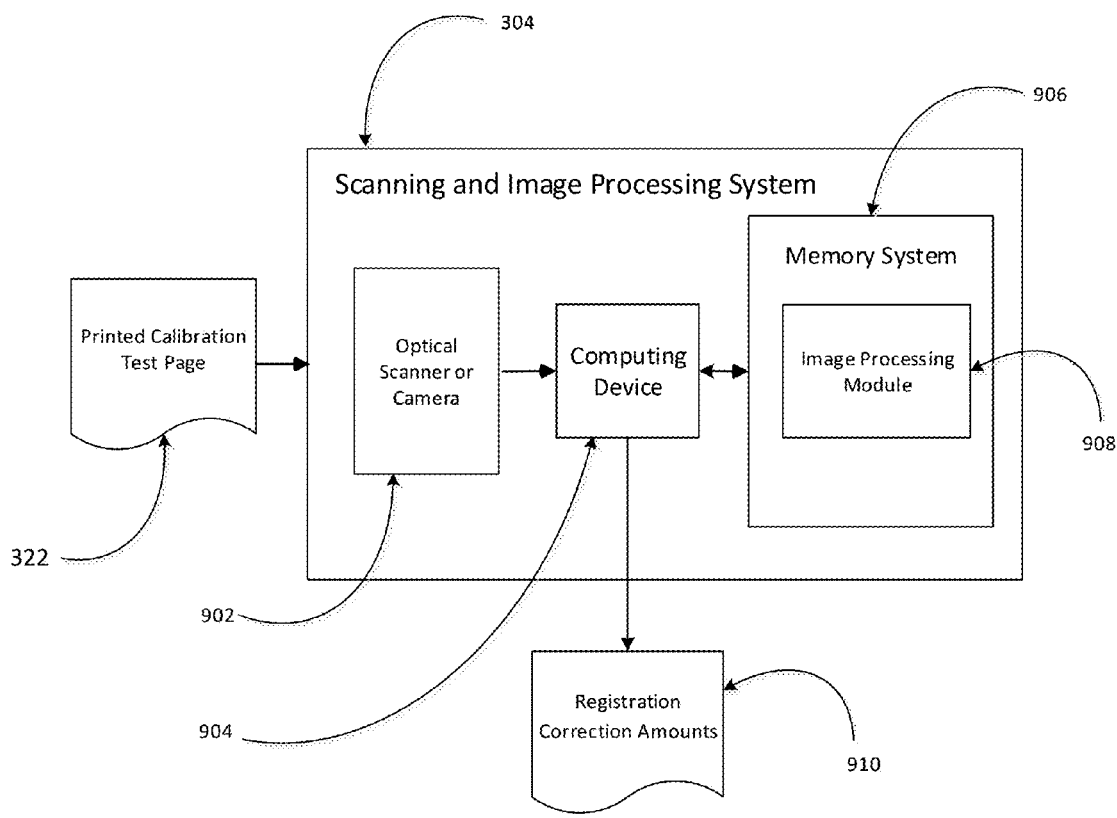
FIG. 9 is a high level block diagram showing the scanning and image processing system according to the present invention.
Figure 10:
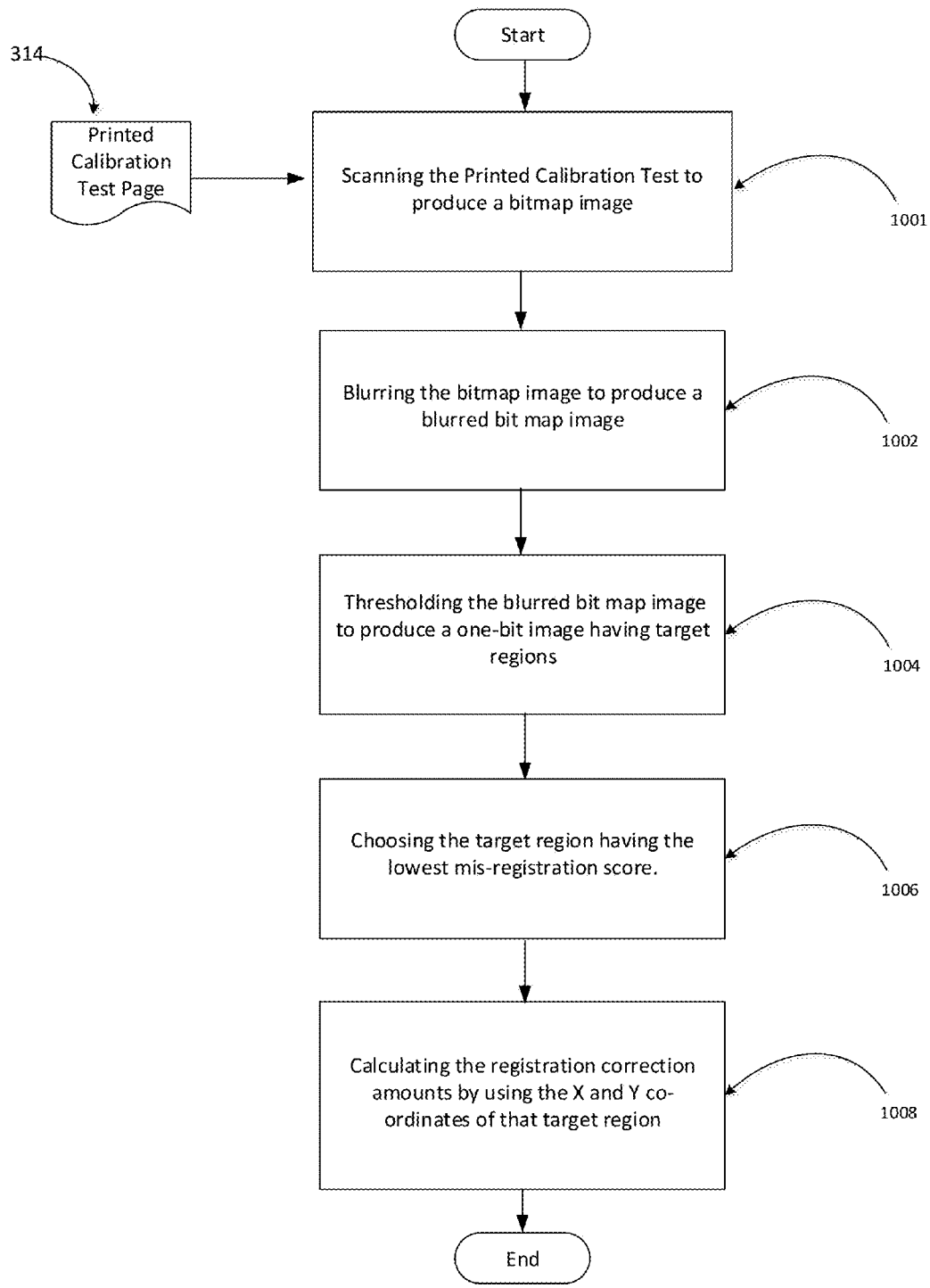
FIG. 10 is a high level flow chart describing the process of the scanning and image processing system.

Referring to FIGS. 9 and 10, scanning and image processing system 304 generally comprises an optical scanner or camera 902, a computing device 904, a memory system 906, and an image processing module 908 stored on memory system 906. As indicated by a block 1001, module 908 comprises code to scan a printed test page 314, producing a bitmap image. As indicated by a block 1002, module 908 comprises code to blur the bitmap image to produce a blurred bitmap image. As indicated by a block 1004, module 908 comprises code to threshold the blurred bitmap image to produce a one-bit image. As indicated by a block 1006, module 908 comprises code to choose the target region of the one-bit image having the lowest mis-registration score. As indicated by a block 1008, module 908 comprises code to determine the registration correction amounts 810 by using the X and Y co-ordinates of the target region having the lowest mis-registration score. Optical scanner or camera 902 may any one of a variety of well known and widely available relatively low resolution devices and thus low cost compared to higher resolution and higher cost scanners and cameras required by conventional printing registration systems.

Figure 11:
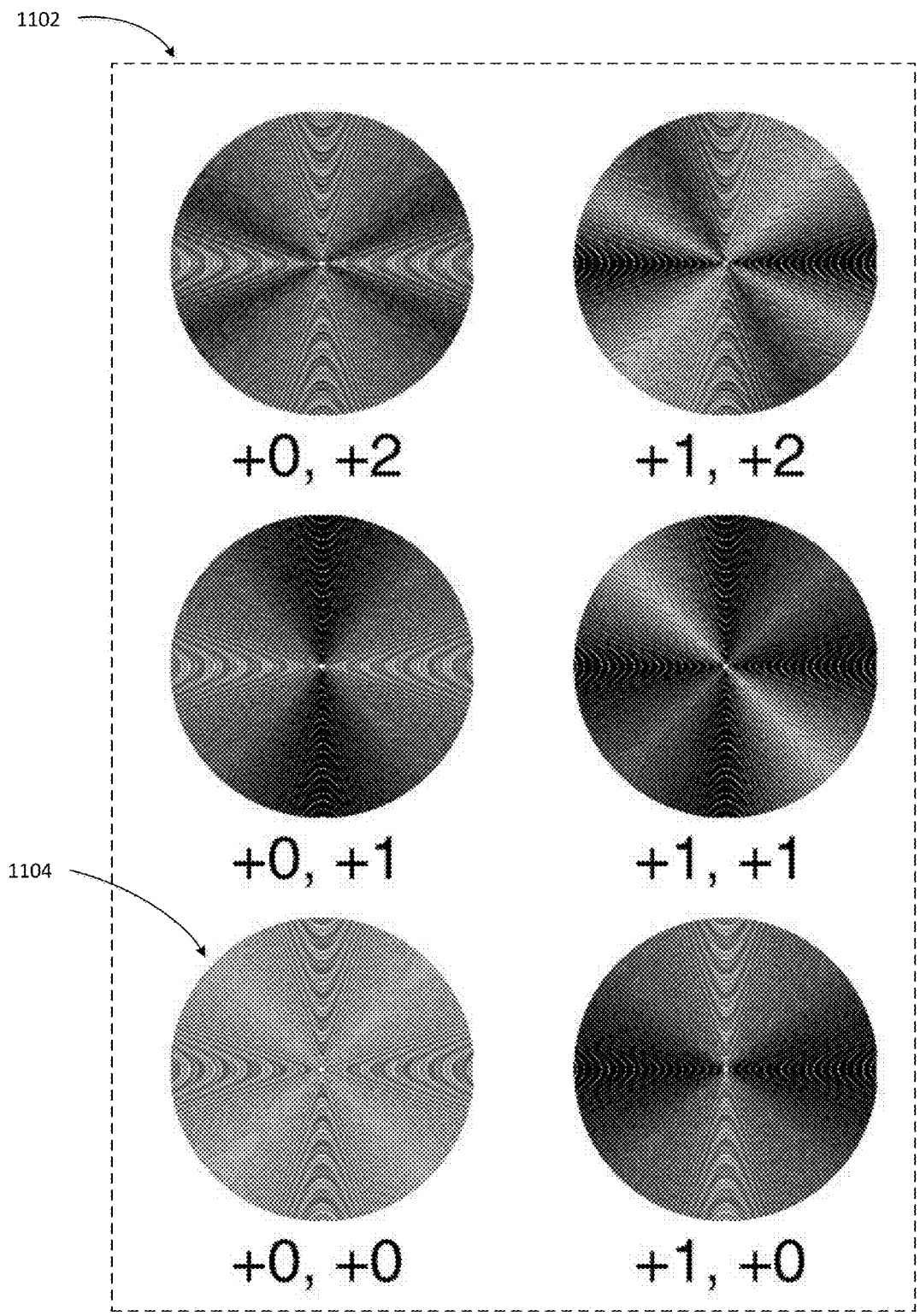
FIG. 11 is an image of a portion of a printed digital calibration page showing six (6) pairs of registration targets with the central 0, 0 pair in the lower left.
Figure 12:
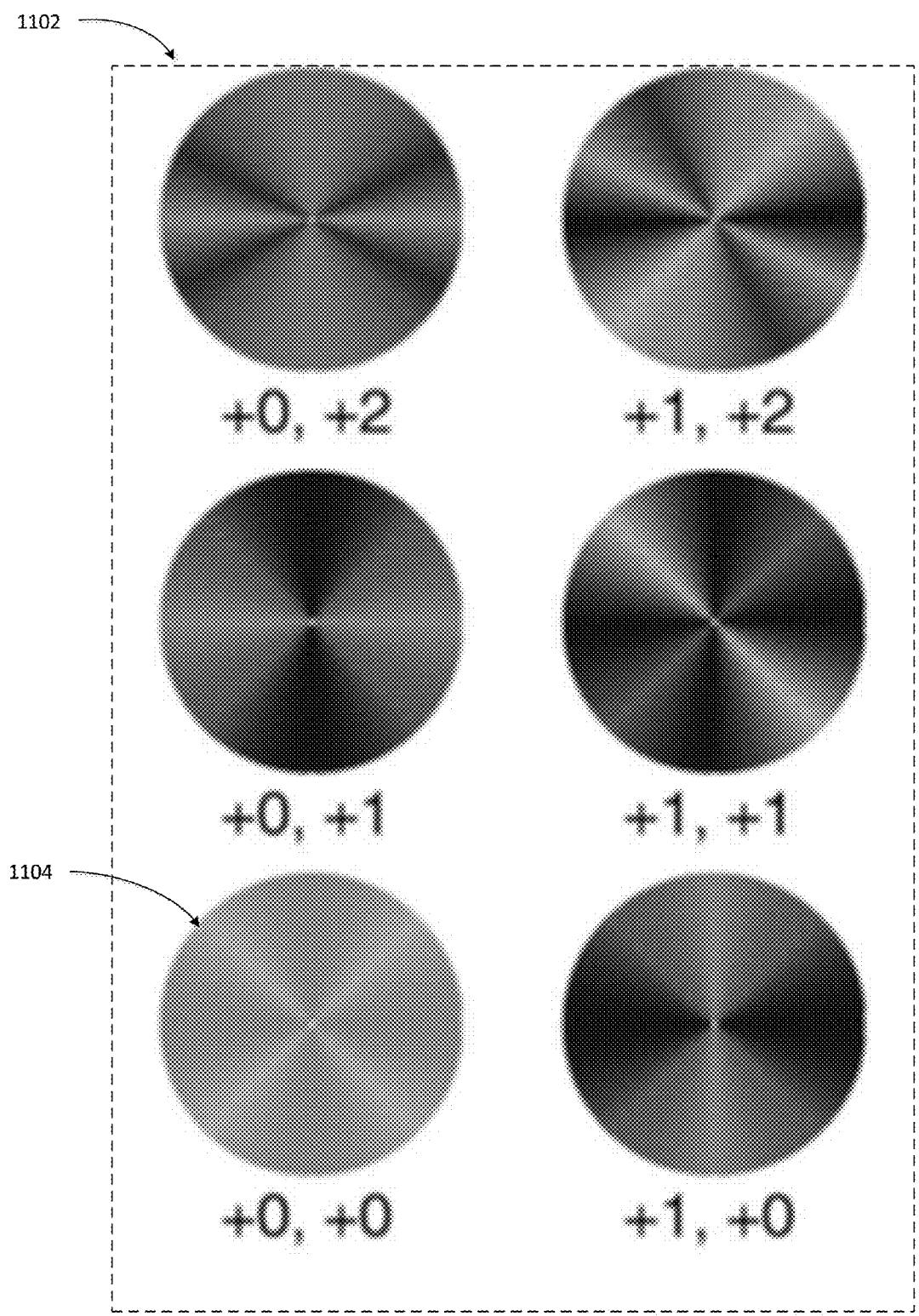
FIG. 12 is the image of FIG. 11 after the process of blurring.
Figure 13:
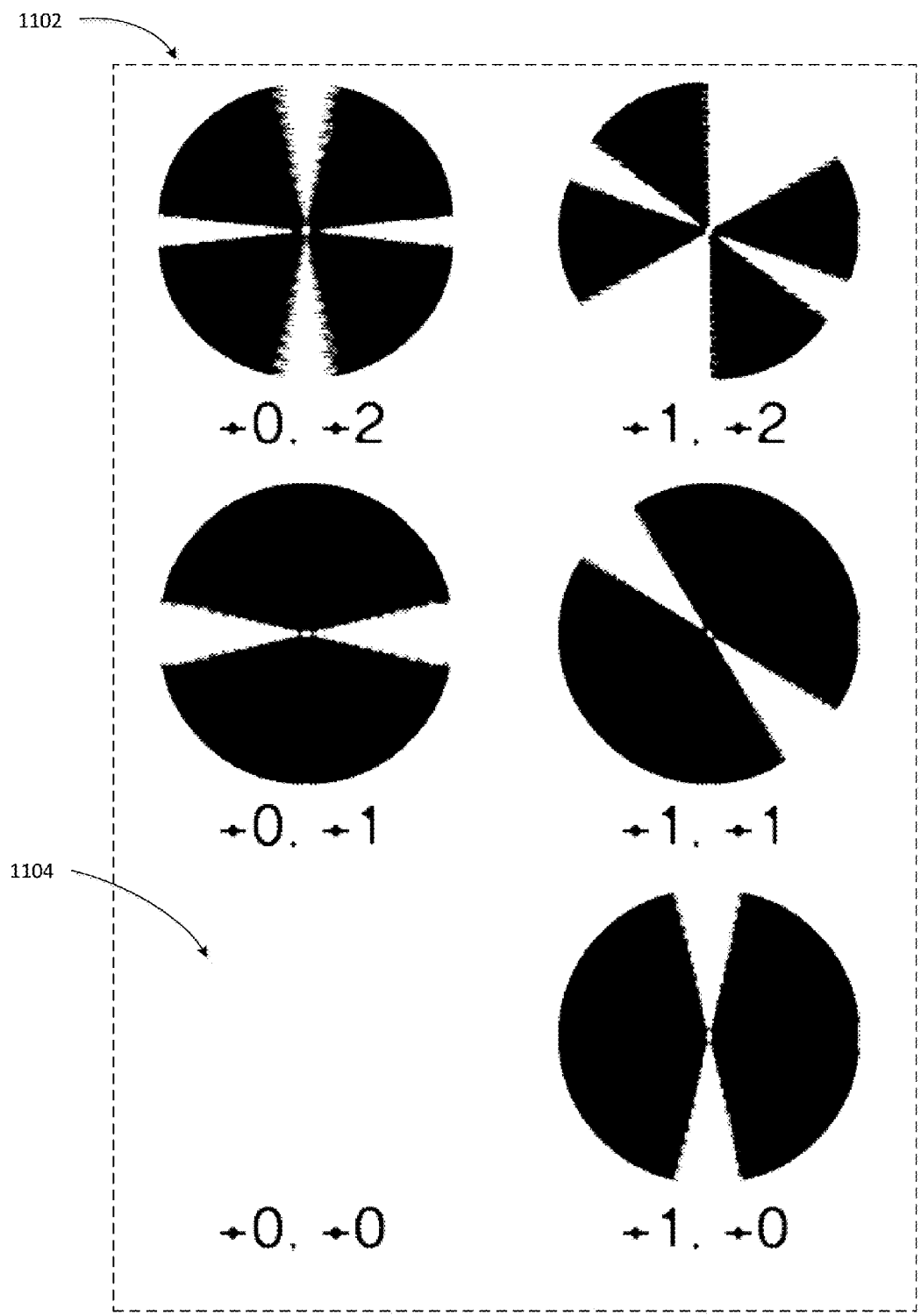
FIG. 13 is the image of FIG. 12 after the process of thresholding. indicating that the pair of registration targets at coordinates 0, 0 has the lightest image of the six (6) pairs of targets.
Figure 14A:
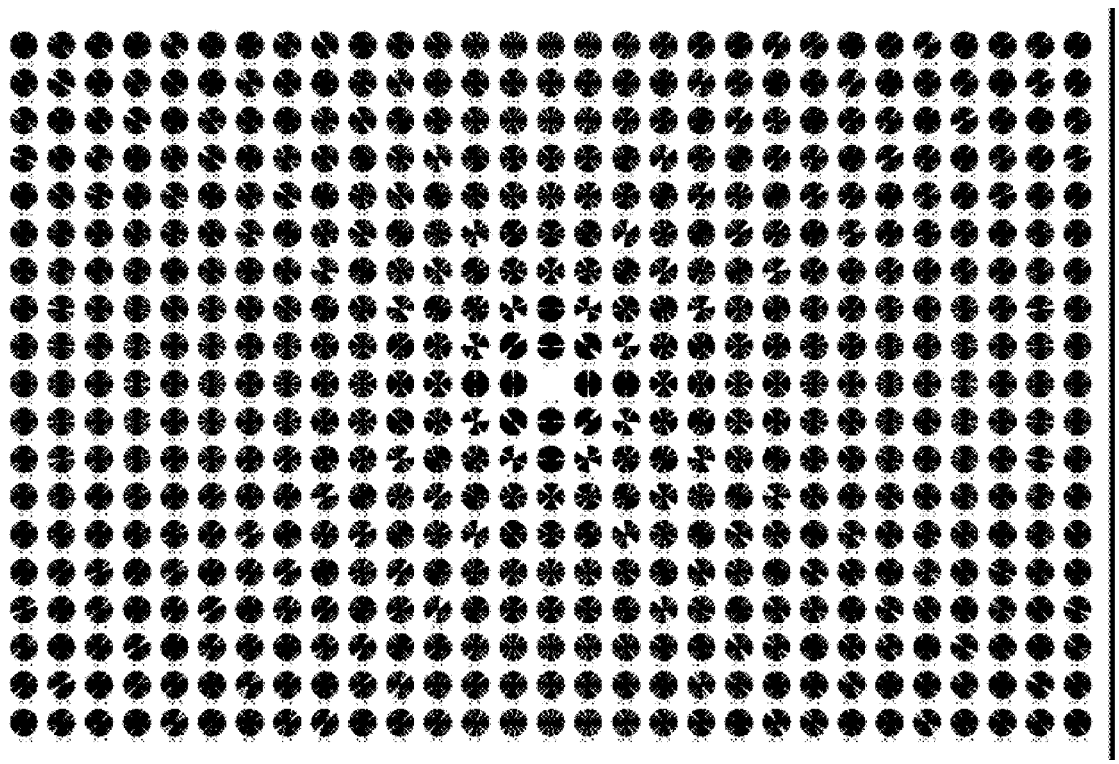
FIGS. 14A and 14B are images of a digital calibration test pattern of FIG. 8 for registering the black and magenta print heads of a digital printing machine after scanning, conversion of magenta to black, blurring, and thresholding have been performed.
Figure 14B:
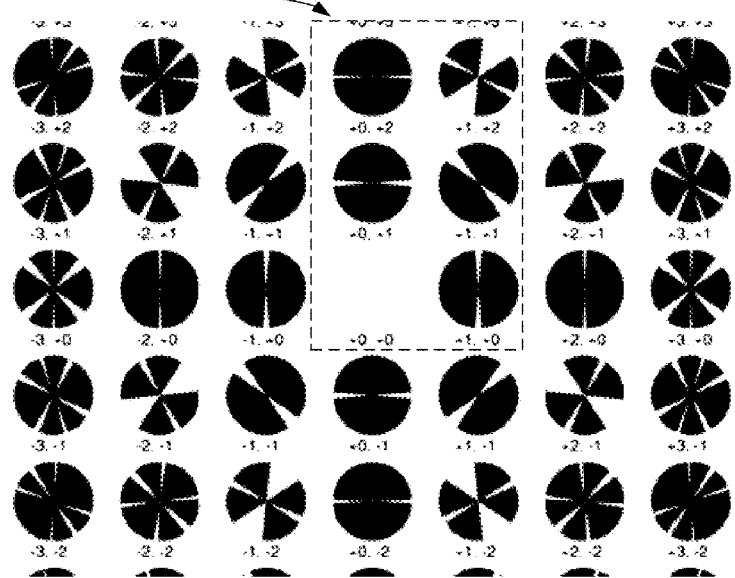

Referring to FIGS. 11-14, where the operation of scanning and image processing system 304 is further illustrated by determining the mis-registration for an ideal printing machine. FIG. 11 shows an image of a portion of a digital calibration test pattern printed and scanned by an ideal printing machine comprising six (6) pairs of registration targets. The central pair of registration targets 11104 displays a notable lack of any moire pattern. FIG. 12 is an image of the portion of FIG. 11 after the process of blurring. Target pair region 1104 appears to be the lightest displaying a lack of any moire patterns while the others pairs of registration targets each have pronounced moire patterns. The scan of FIG. 11 was composed of only white or black pixels. Portions just appear to be gray to the eye. In contrast, the image after blurring (FIG. 12) actually contains gray pixels for those regions that appear to be between white and black in tone. FIG. 13 is an image the portion of FIG. 12 after the process of threshholding showing that the pair of registration targets at coordinates X,Y, of 0,0 have the lightest image of the six (6) pairs of targets. Thresholding makes any gray area lighter than 50% (or possibly some other threshold) appear completely white. Any gray area darker than the threshold appears completely black. The target region corresponding to pair of registration marks 1104 is the lightest and has completely vanished. Because this pattern is from registration targets perfectly registered, there was no moiré patterns. There are thus no darker gray levels. FIGS. 14A and 14B show the larger context from which the six patterns of FIG. 11 were actually taken. This is an array of target pairs, 19 rows by 29 columns. In each position the two patterns used to make the moire pattern are shifted by a unique amount, corresponding to the row and column number of that position. In this case the pattern of FIG. 14A is an overlay of two inks, Magenta and Black. In the processing, the magenta has also been colorized to black. FIG. 21B shows a close-up sub-section of FIG. 14A, having 5 rows and 7 columns of patterns. Dotted line rectangle 1102 is the six mark image of FIG. 11. The essential point of FIGS. 14A and 14B is that only the best pattern, the lightest one after processing, the central pattern labeled "0, 0", vanishes.

Figure 15A:
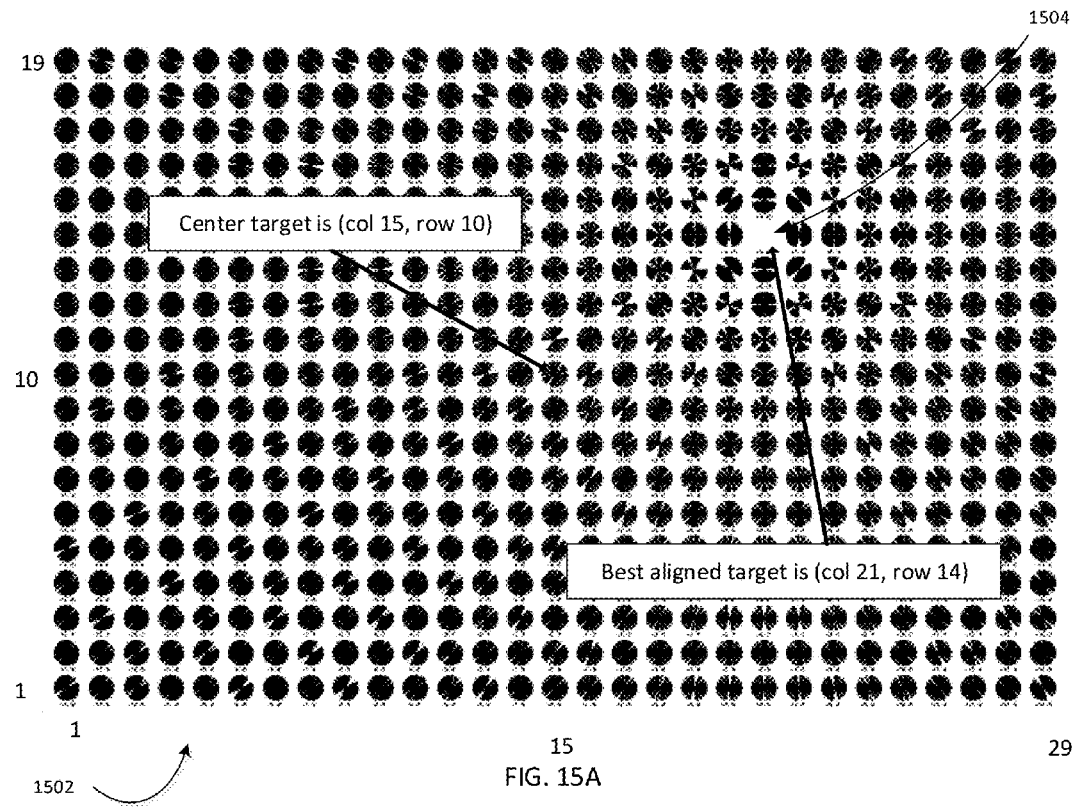
FIGS. 15A and 15B are images of the digital calibration test pattern of FIG. 8 for registering the black and magenta print heads of a digital printing machine after scanning, conversion of magenta to black, blurring, and thresholding have been performed, printed with the separation magenta offset with respect to black, and after image processing, showing that the pair of registration targets at coordinates X=4, Y=6 have the lightest image of all the pairs of registration targets and is the best aligned pair.
Figure 15B:
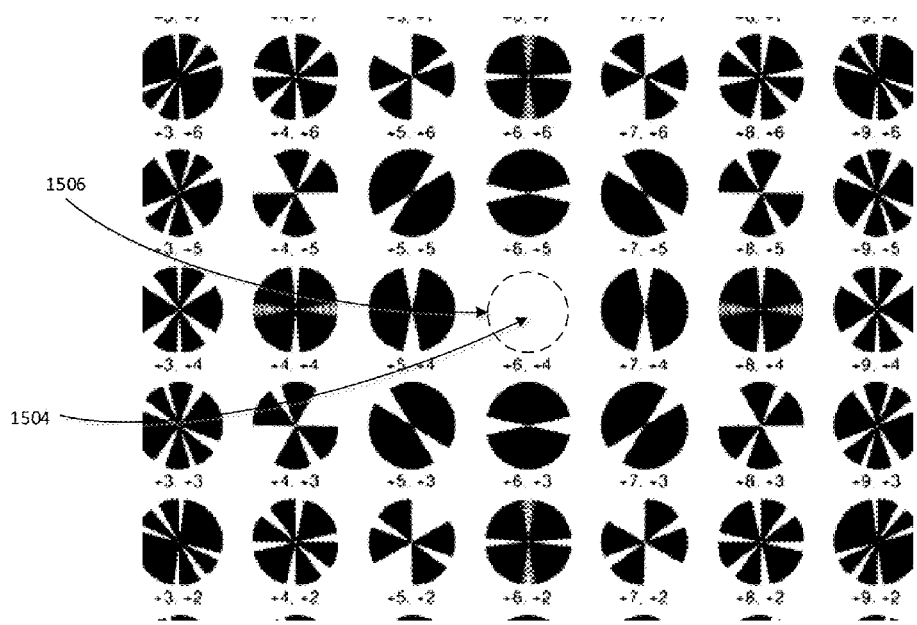
Figure 16:
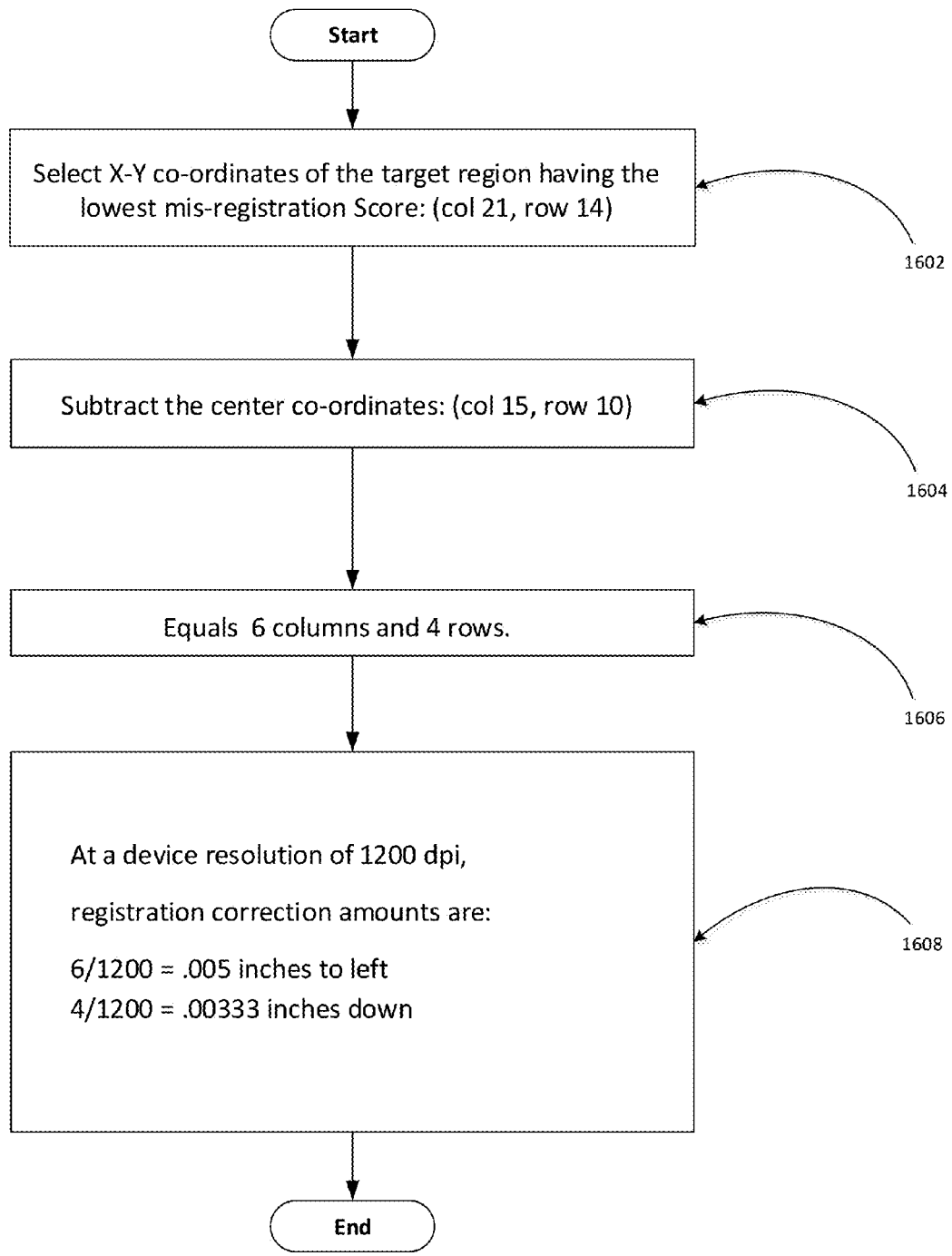
FIG. 16 is a high level flow chart showing the calculation of registration correction amounts for the scanned and printed digital calibration test pattern of FIGS. 15A-15B.

Referring to FIGS. 15-16, where operation of scanning and image processing system 304 is further illustrated by determining the mis-registration or correction amounts for a non-ideal or actual printing machine. FIG. 15A shows a digital calibration test pattern 1402 after blurring and threshholding. Digital calibration test pattern 1402 was produced for the purpose of aligning the black and magenta separations or print heads. Digital calibration test pattern 1402 is an array of 19 rows by 29 columns of pairs of registration targets, one of black overprinted with one of magenta. The black registration targets are equally spaced both horizontally and vertically. For the magenta registration targets the central one is positioned exactly on top of the central black registration mark. The magenta pixels shown have been first converted to be black. This pair of marks is on row 10 column 15 and is labeled underneath as "+0, +0". Each of the magenta registration marks, placed in the programmatically-produced Pdf test file, has a unique offset, or purposeful built-in mis-registration relative to the black registration mark below. The amount of offset depends on the row and column position in the array of the digital calibration test pattern 1502. This can be more clearly seen by zooming in at high levels in FIGS. 15A and 15B. The pair of registration targets 1504 located at X-Y coordinates +6,+4 have the lightest image of all the pairs of registration targets. FIG. 15B shows an enlarged view of the portion of the digital calibration test pattern of FIG. 15A with the pair of registration targets 1504 at X-Y coordinates +6,+4 at center with a target region 1506 having the lightest image of all the pairs of registration targets. In this example, the magenta separation was offset 6 pixels to the left and 4 pixels down in order simulate a printing press with these same amounts of mis-registration between Black and Magenta. The center pair of registration targets is no longer the lightest. It no longer drops out after processing. Instead, the pair of registration targets 1504 with its target region 1506 at row 21 column 14 that drops out. This corresponds to the pair of registration targets with a purposeful shift of 6 pixels to the right and 4 pixels up. That amount of shift corrects for the 6 pixel left and 4 pixel down mis-alignment built into the simulated digital printing machine.

Referring to FIG. 16, where a high level flow chart shows the process to determine the correction amounts for the print heads in both the x and y direction. As shown by a block 1602, module 908 comprises code to select the X-Y coordinates of the pair of registration targets having the lowest mis-registration score. In this example, the lowest mis-registration score or the best aligned pair of registration targets (lightest image) is at X,Y coordinate located at column 21, row 14. As shown by a block 1604, module 908 comprises code to subtract the center co-ordinates at column 15, row 10 from the best aligned pair of registration targets (lightest image) at X,Y coordinate located at column 21, row 14. As shown by a block 1606, the difference between best aligned pair of registration targets at X,Y coordinates located at column 21, row 14 and the center co-ordinates at column 15, row 10, is a value of 6,4, or six (6) columns and four (4) rows. As shown by a block 1608, module 908 comprise code to determine the registration correction amounts in the X and Y direction based upon the configuration of the digital printing machine. For example, a device resolution of 1200 dpi, registration correction amounts 0.005 inches to the left (6/1200=0.005) and 0.00333 inches down (4/1200=0.00333).

Figure 17:
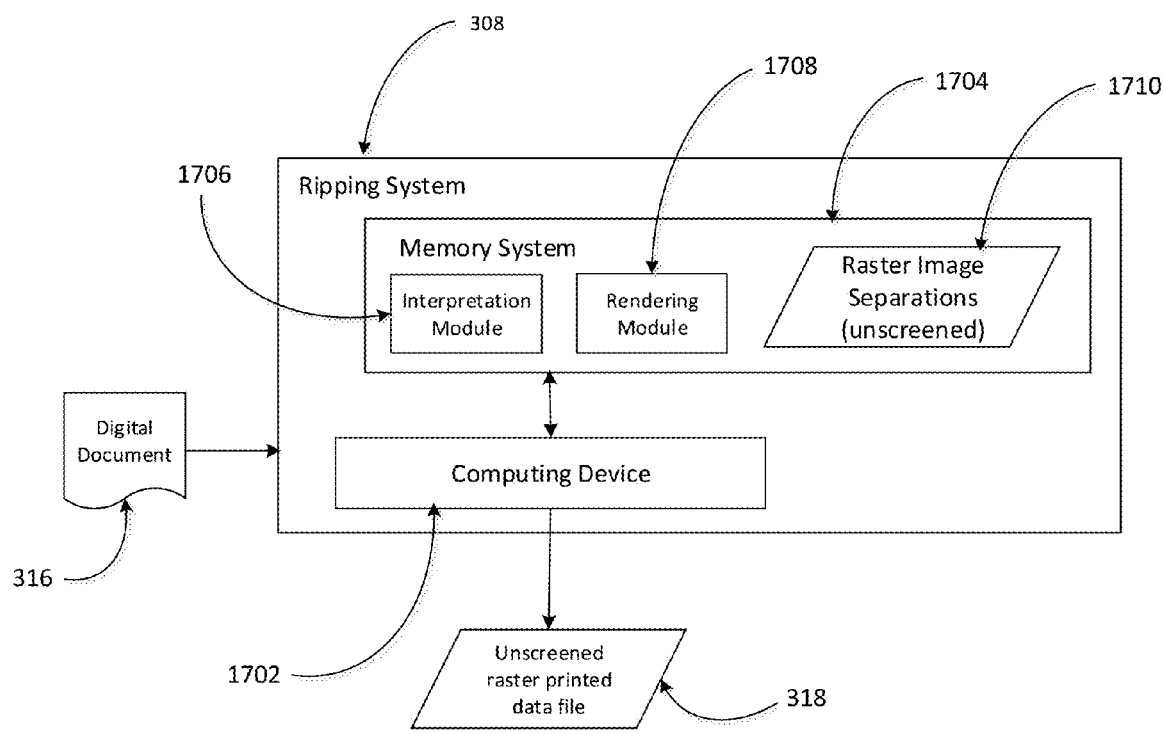
FIG. 17 is a high level block diagram showing the ripping system according to the present invention.

Referring to FIG. 17, where ripping system 308 is illustrated. System 308 comprises a computing device 1702, a memory system 1704, an interpretation module 1706 stored on memory system 1704, and a rendering module 1708 stored on memory system 1704. As is well known in the art, interpretation module 1706 and rendering module 1708 comprise computer instructions or code to produce un-screened raster image separations 1710 from digital document 314 that are in a non-raster image format (for example, pdf). If digital document 314 is a raster file, then digital document 314 requires only raster processes, such as scaling and color conversion, to produce unscreened raster image separations 1710. Unlike many ripping systems, in the preferred embodiment, ripping system 308 does not employ a screening module to screen the raster image separations 1710. As will be described more fully herein, the screening module is part of registration correction system 306 where screening and correcting operations are performed by a high performance computing device.

Figure 18:
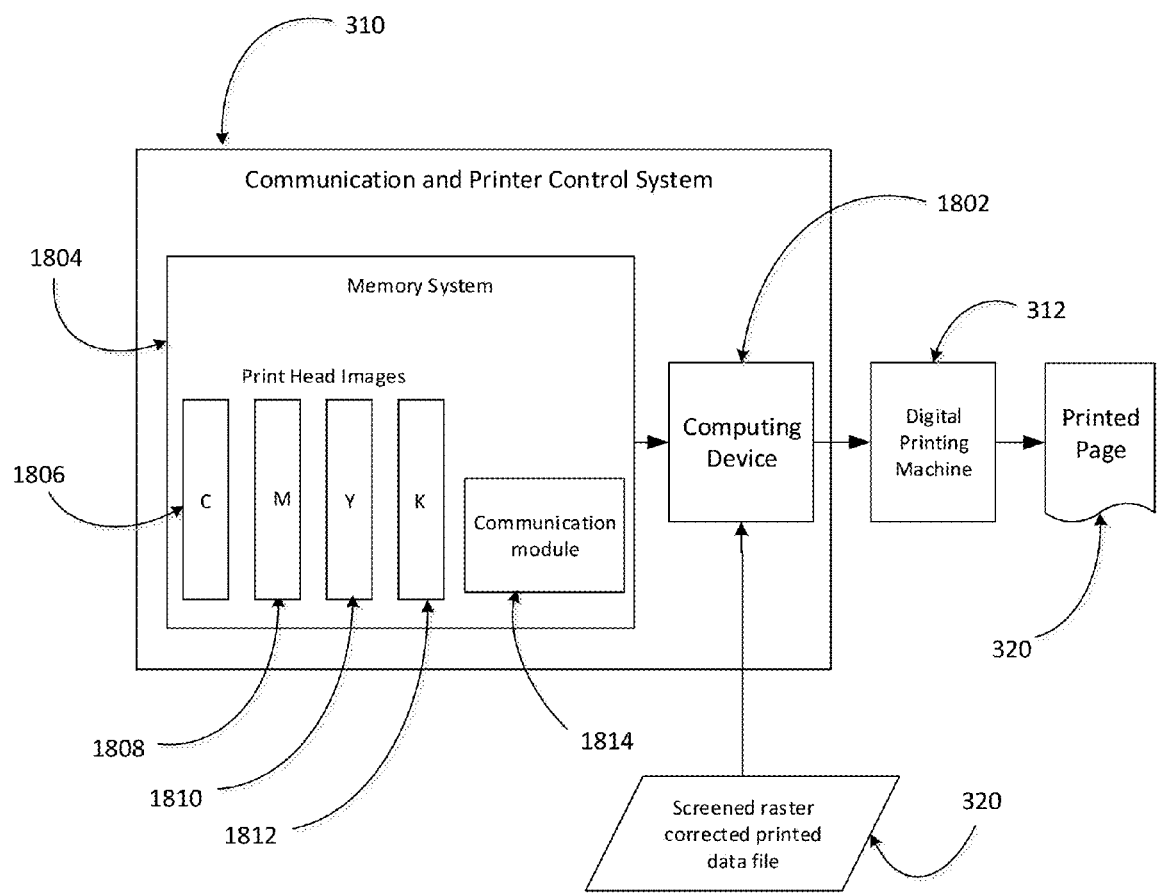
FIG. 18 is a high level block diagram showing the communication and printer control system according to the present invention.

Referring to FIG. 18, where communication and printer control system 310 is illustrated. As is well known in the art, system 310 comprises a computing device 1802, a memory system 1804, screened data for a cyan print head 1806, screened data for a magenta print head 1808, screened data for a yellow print head 1810, screened data for a black print head 1812, and a communication module 1814 stored on memory system 1804. As is well known in the art, communication module 1814 comprises code to convert a screened bitmap to proper format and output control signals to be communicated to digital printing machine 312 for positioning of the CMYK print heads and multi-level ink output.

Figure 19:
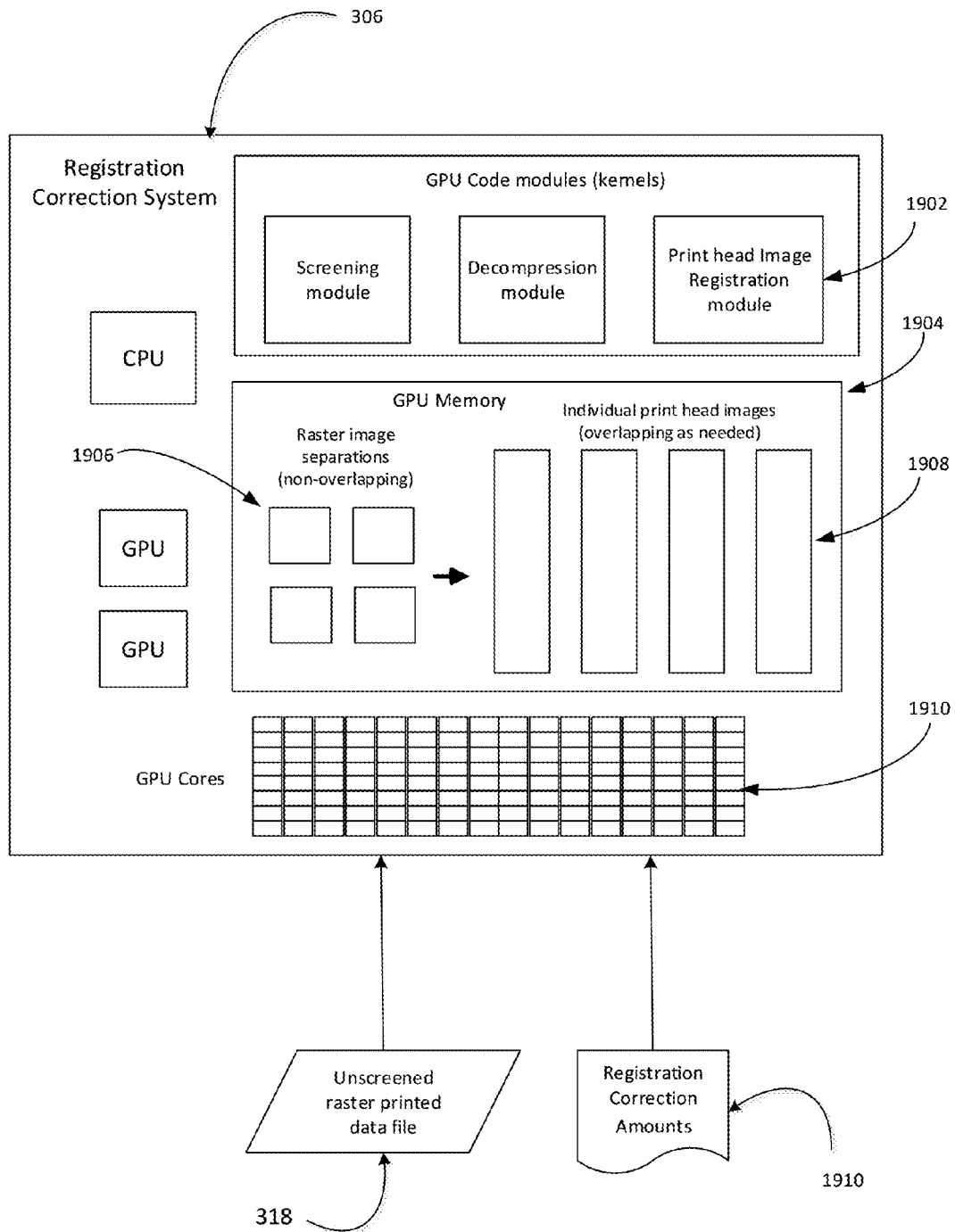
FIG. 19 is a high level block diagram showing the registration correction system according to the present invention comprising two (2) graphic processing units (GPU) and a GPU memory system.

Referring to FIG. 19, where registration correction system 306 is illustrated. System 306 is responsible for repositioning the print data by needed amounts. GPUs (Graphical Processing Units) are a state-of-the-art hardware development wherein thousands of CPU-like cores 1910 operate simultaneously to produce extremely high aggregate compute power. An additional capability, key to this invention, is the memory system of the GPUs, 1904. Current GPU boards such as the NVIDIA Tesla K10 have 8 Gigabytes of dedicated memory on them. Most importantly, the bandwidth or speed memory transfers for GPU memory is 30 to 100 times faster than CPU memory. For current CPUs a tight loop of code may achieve a transfer speed of a gigabyte per second. If DMA (Direct Memory Access) is used the memory transfer speed may reach 10 gigabytes per second. The Tesla K10 GPU memory, used in the preferred embodiment, has an aggregate internal memory bandwidth of 320 gigabytes per second. Moreover, when several GPU boards are utilized, as done in the preferred embodiment of the invention, the boards operate simultaneously on separate memory, further multiplying the total memory transfer speed or bandwidth by a factor of the number of boards used. Each one of the multiple choices involves the printing of a pair two overlapped patterns, one for each of the two print heads whose output is to be aligned. The printing from each of the two print heads must therefore be capable of overlapped printing. In GPU memory 1904, in addition to a full, non-overlapped page of raster data separations 1906, loaded from raster image separations 603, specific sets of data 1908 for each print head are produced and maintained. This data is produced from the non-overlapped data via data sampling. As a separate step, it is the individual print head image data which gets communicated to the printer to produce printed output, as shown in the communication and printer control system 618.

Figure 20:
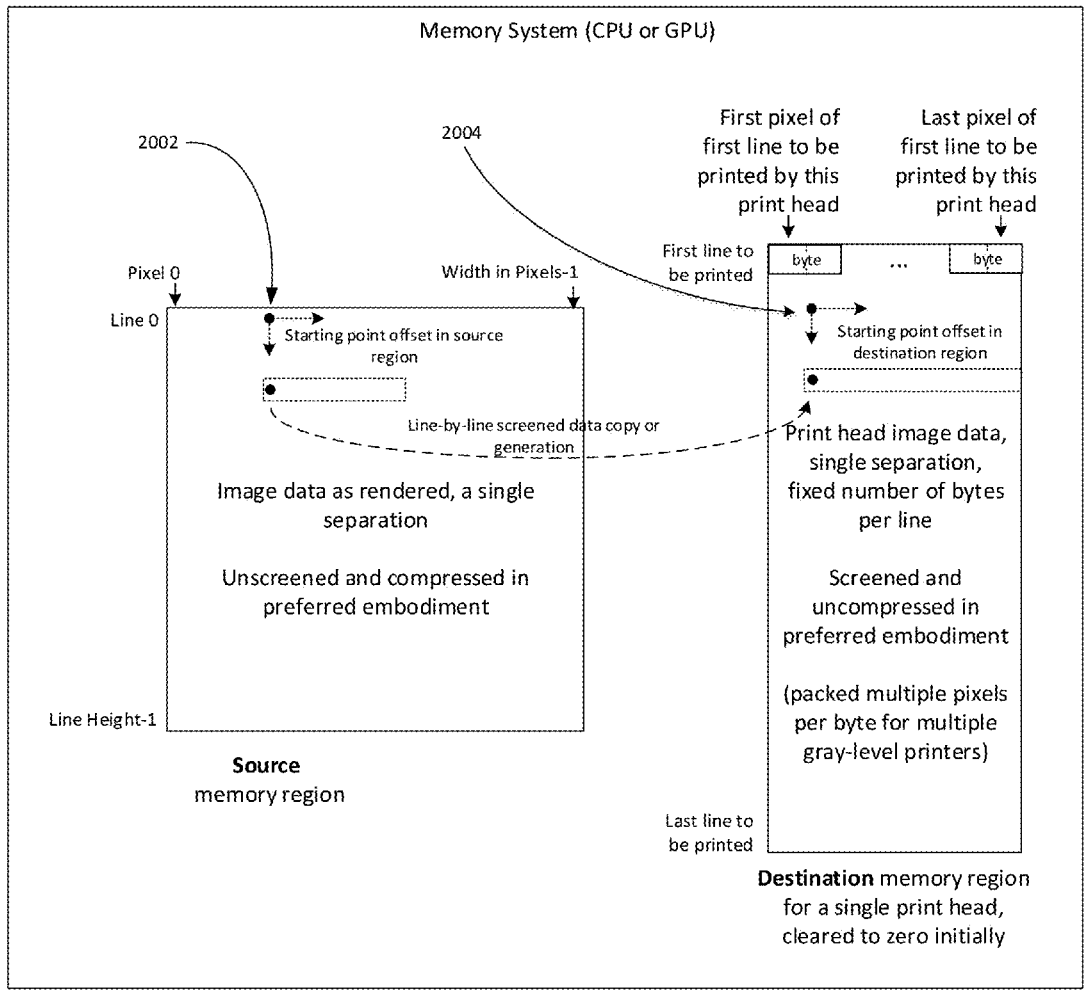
FIG. 20 is a high level block diagram showing the GPU memory system of the registration correction system according to the present invention.

Referring to FIG. 20, where a high level block diagram shows the memory transfer operations in a preferred embodiment of registration correction system 306. The essential operation is copying lines of data, or portions of a line of data, from a source point in a memory image of the a rendered separation to a destination point, also in memory, of a memory image of the exact data to be sent to a print head. Selectable offsets 2002 in the source image memory region and 2004 in the destination memory region allow for adjustment of the position of the data in the destination to be offset in increments of individual pixel positions in X and or Y. There are general variations of this operation known as "Bit-BLt", for bit-boundary block transfer to those skilled in the art. In the preferred embodiment the source image is uncompressed and screened on the fly as part of the operation. Generally BitBlt has been implemented using a single CPU which sequentially transfers data line by line sequentially. The preferred embodiment has both the source and destination memory regions in GPU memory and uses GPU kernel code to transfer the lines. GPUs, which have thousands of cores operating in parallel, can greatly speed up this operation by processing many multiple lines simultaneously.

Figure 21:
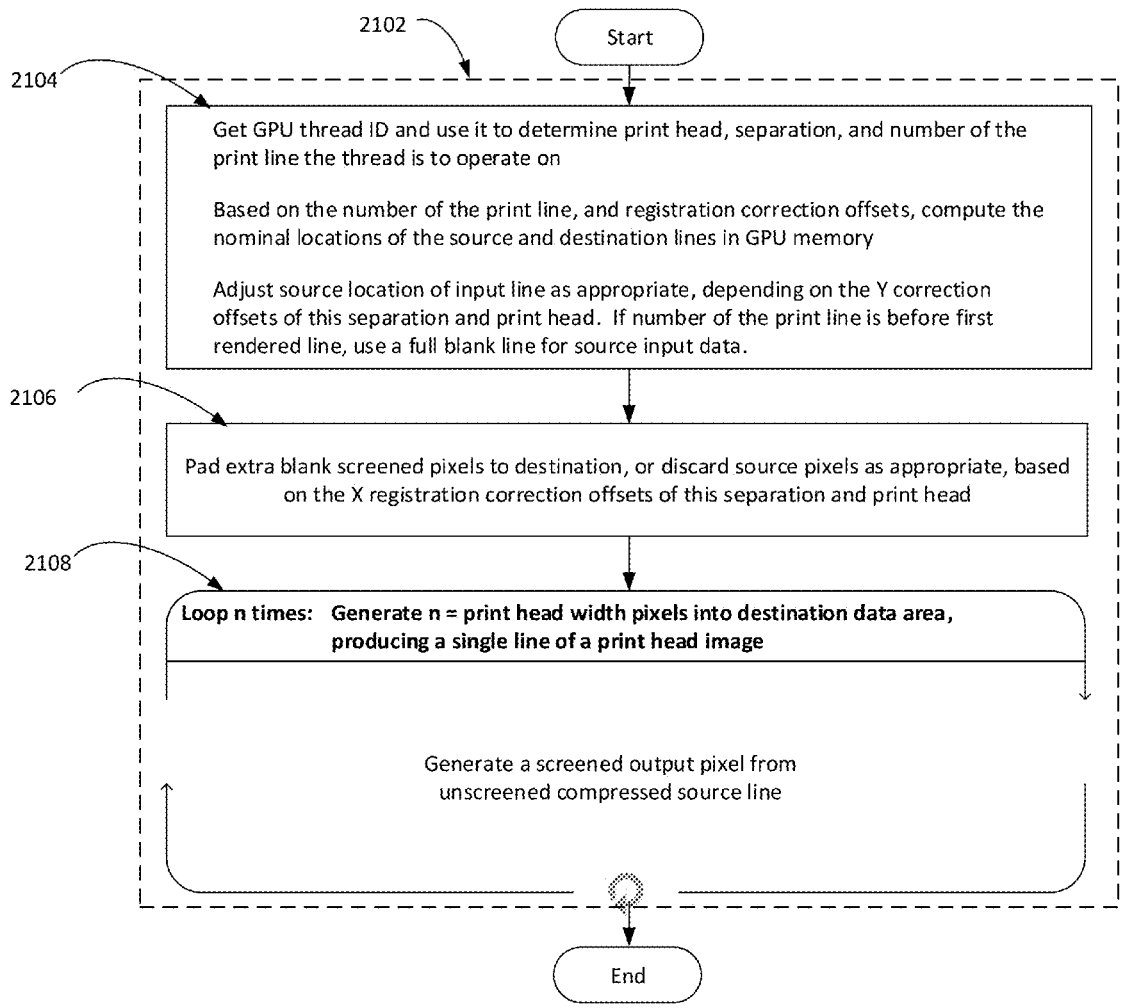
FIG. 21 is a high level flow chart showing the operation of the registration correction system.

Referring to FIG. 21, where a high level flow chart further illustrates the operation of registration correction system 306 written in CUDA. As shown by a block 2102, system 306 comprises code, called a kernel, configured to run on a GPU (Graphic Processor Unit) with multiple cores. In the preferred embodiment these GPUs are located in plug-in accelerator boards such as the NVIDIA Tesla K10 or the later Tesla K80 having 4992 cores. Multiple GPU cores operating in parallel, each with its own execution thread, are launched to run, executing the one common kernel. This powerful architecture is referred to as SIMT (Single Instruction Multiple Thread). Block 2102 is a flowchart of this single kernel code. Step 2104 of kernel code 2102 is an individualization step, executed at the beginning of a thread, identifying the thread number, referred to as the threadID. This thread will generate a single line of destination pixels based on a single line of source data. Step 2104 adjusts for a positive or negative Y offset when calculating the start-of-line positions for the source and destination. In the case of an upward offset of the destination relative to the source, source lines are skipped and the first destination line is produced from data from a subsequent source line. In the case of a Y offset in the other direction, preliminary blank lines are inserted into the destination. Step 2106 takes care of a similar discarding or addition in the X direction. Blank pixels are added to the destination or source pixels are discarded prior to each thread's executing the main loop of the kernel Step 2108. Step 2108 is a single loop, generating consecutive ready for transmission pixels on a line, from source to destination. As an example, an 8.5" wide by 20" high image for a single print head at 1200 dpi would involve 24000 lines of data being produced, each of which contains 10,200 screened pixels. These 244.8 million screened pixels would not be generated sequentially and slowly. Rather, 24,000 threads would be created and launched on the 4992 cores (of a single Tesla K80 GPU board). Each core would process about 5 lines in sequence, producing 10,200 pixels for each line. The use of the GPU cores operating simultaneously brings the needed speed increase. Whereas a single CPU would generate the 24,000 lines one at a time, the GPU implementation described would generate them 4992 lines at a time. Use of additional GPU boards could provide further throughput increase.

Figure 22:
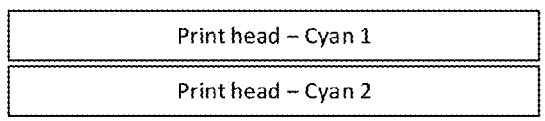
FIG. 22 is an image of a digital calibration test pattern comprising pairs of registration targets for two (2) print heads printing the same ink for reasons of speed or clogged nozzle redundancy. Patterns are for one ink at a time
Figure 22:
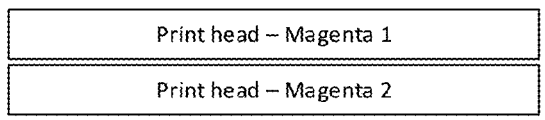
Figure 22:
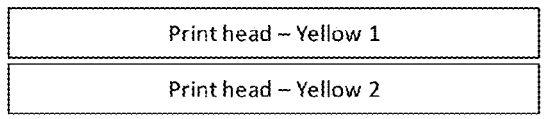
Figure 22:
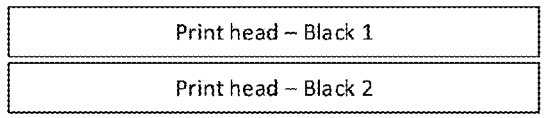
Figure 22:
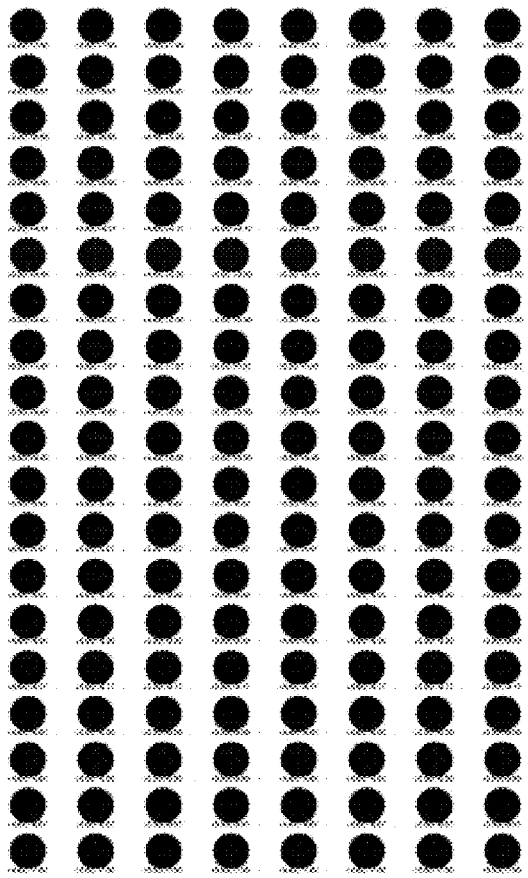

Referring to FIG. 22, where print registration patterns are shown for the case of two same-ink print heads used for reasons of speed or redundancy. In this case the normal operation of printing does not involve direct overlapping of the data from the two same color print heads. Rather the print data is interleaved. For this reason use of this invention for such registration requires that the printer communication protocol allow for non-normal arrangement of data. When each head has its own data stream, when alignment is required, specific data can be sent which does produce either full or partial overlapping of the print of two same color print heads.

Figure 23:
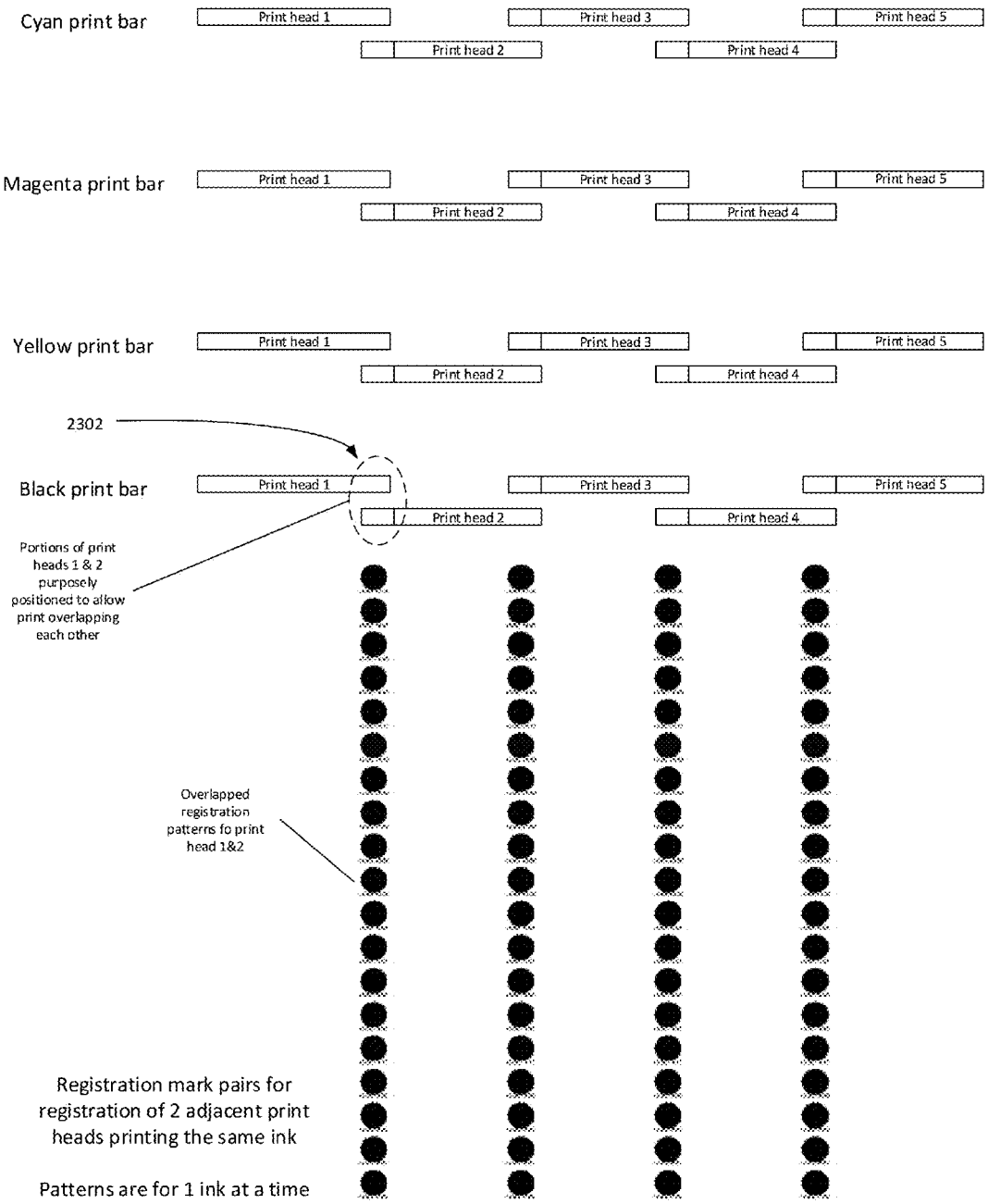
FIG. 23 is an image of a digital calibration test pattern comprising pairs of registration targets for two (2) adjacent print heads printing the same ink.

Referring to FIG. 23, use of the system and process of the present invention to align the printing of two adjacent print heads in one print bar requires additional description. By definition, adjacent print heads do not inherently print so as to overlap. The adjacency is used in fact to cover separate portions of the imaging area. For such registration, a specific and non-insignificant amount of overlap must be integrally part of the print engine design and initial placement of the adjacent heads. A region 2302 shows that print heads 1 and 2 of the black print bar are designed and positioned to overlap by enough to produce a registration mark. During production printing the printing controller software makes sure that data is sent to only one of each pair of such purposely overlapped nozzles. This is not the case when printing calibration targets, however, where overlapped targets of different amount are printed as will be described. Thus within the communication channels and protocol there must also be the capability of sending independent data streams to each print head.

Figure 24:
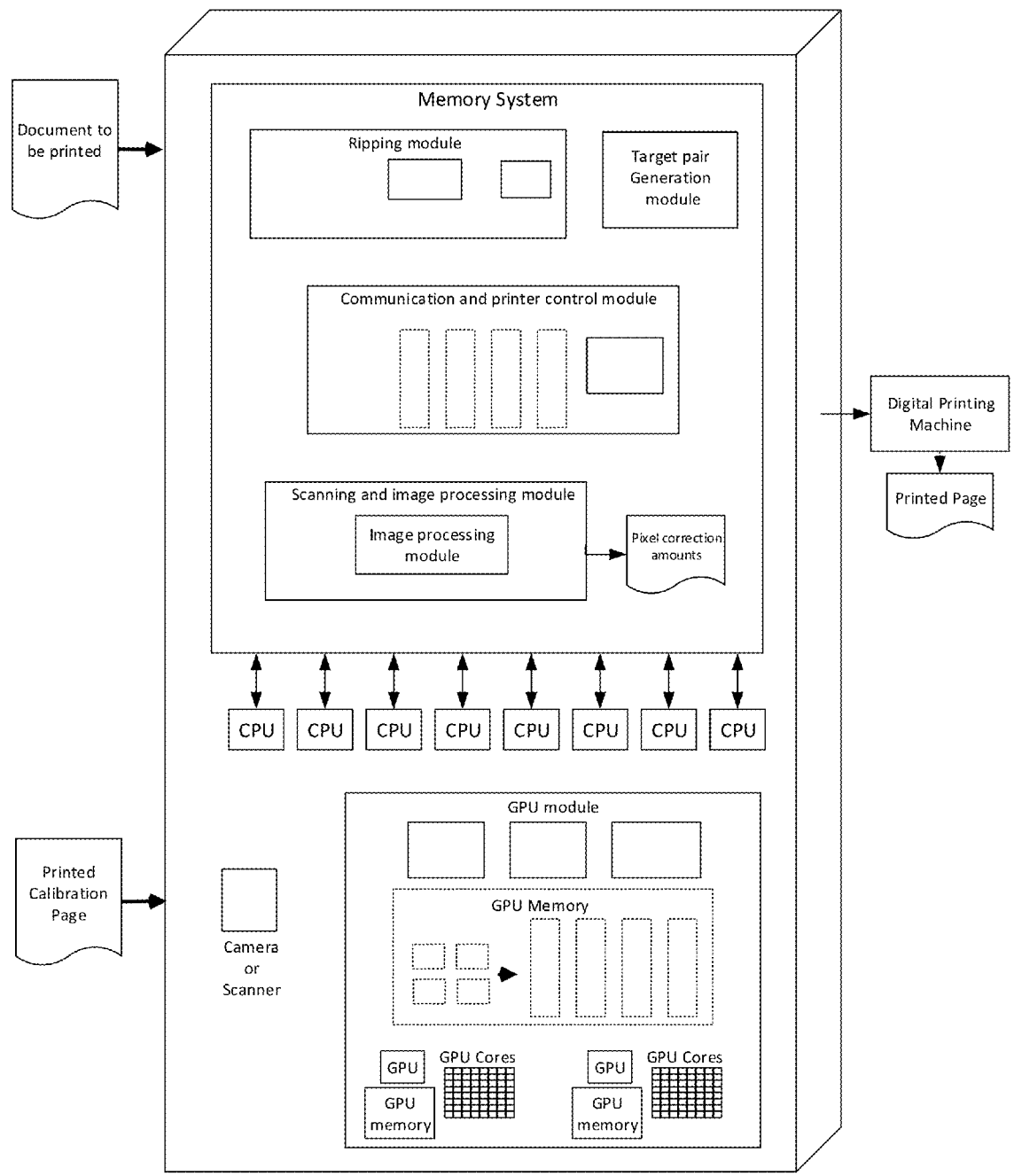
FIG. 24 is a high level block diagram showing system 100 employed in a local area network.
Figure 25:
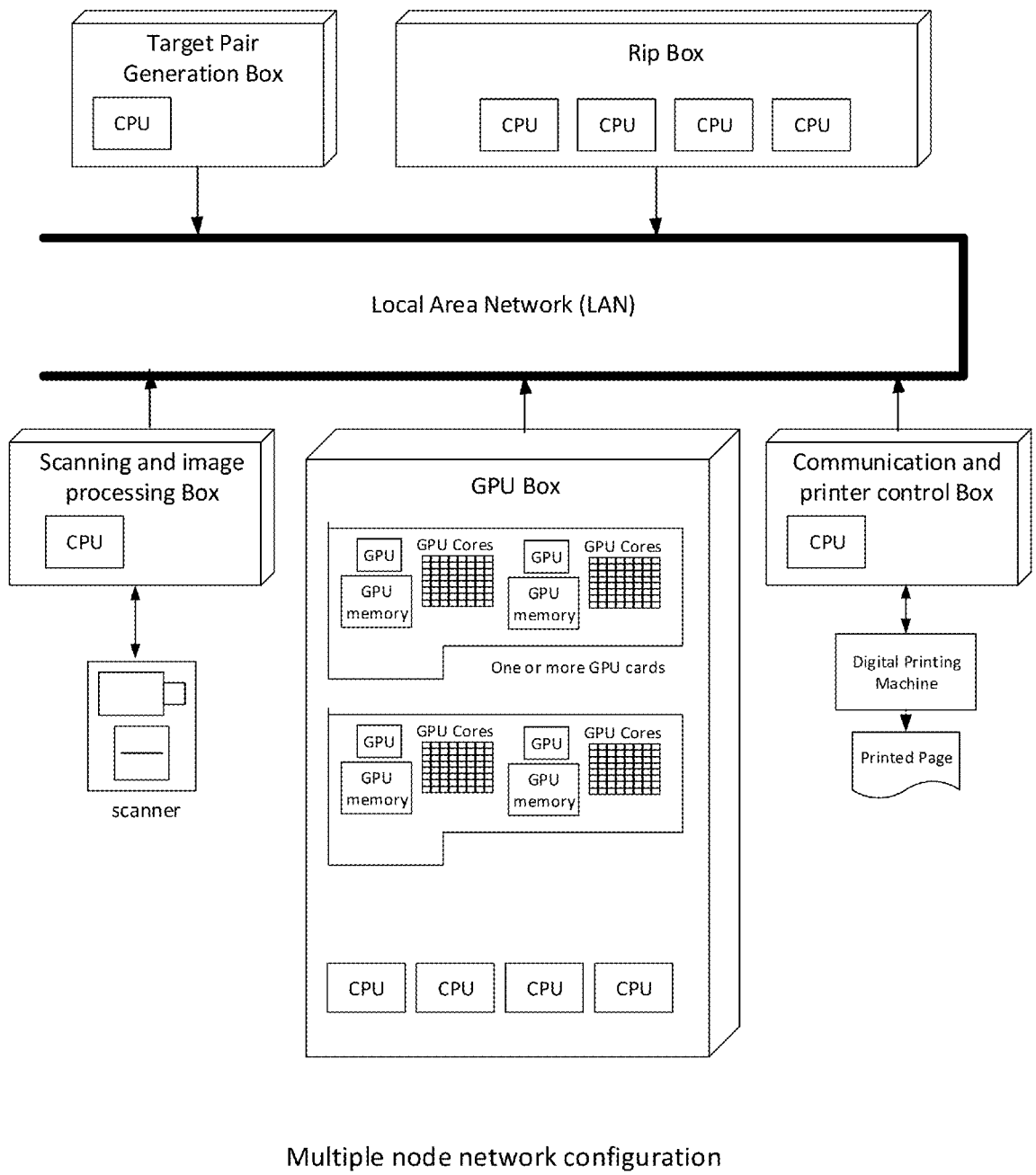
FIG. 25 is a high level block diagram showing system 100 employed in a single computer system configuration.

Referring further to FIG. 23, where multiple print heads are used across the print width as well as multiple print heads being used along the paper direction are illustrated. In this case there must be a sequence of alignments, each aligning the print from a single pair of print heads at a time. In this context "align" means to calculate the needed registration shift amounts and subsequently use them. For example, for the five print heads per ink in the above case, referred to as Cyan1, Cyan2, Cyan3, Cyan4, Cyan5, Magenta1. . . etc, registration correction might proceed as follows:

(1) assume Black1 print head is correct (as the first or reference print head);
(2) align Black2 to Black1, align Black3 to Black2, align Black4 to Black3, and align Black5 to Black4;
(3) align Cyan1 to Black1, Cyan2 to Black2, Cyan3 to Black3, Cyan4 to Black4, and Cyan5 to Black5;
(4) align Magenta1 to Black1, Magenta2 to Black2, Magenta3 to Black3, Magenta4 to Black4, and Magenta5 to Black5; and
(5) align Yellow1 to Black1, Yellow2 to Black2, Yellow3 to Black3, Yellow4 to Black4, and Yellow5 to Black Referring to FIGS. 24 and 25, computer-based systems available currently allow for much flexibility in the configurations and actual physical location of the components. Depending on product requirements and resources, two general architectural approaches are employed. FIG. 24 shows a single computer tower or card cage is used to house all the systems and sub-systems. Well known operating systems, such as Unix or Microsoft Windows, allow all subsystems in the single box configuration to use the same CPU in a multi-tasked approach. For performance, such an approach is usually implemented with multiple CPU chips and cores, for example two quad-core Intel CPU chips providing eight (8) actual CPUs in the one box. Alternatively, the separate systems each have their own physical computer box or card cage, and of necessity their own dedicated CPU(s). They are all usually interconnected via a high speed network configuration as shown in FIG. 25. This approach allows for custom tailoring of compute resources for each component, as well as providing some redundancy and fewer or no points of singular failure.

While particular embodiments of the invention have been shown and described, it will be obvious to those skilled in the art that changes and modifications may be made without departing from the scope of the claimed invention.

What is claimed:

1. A process for measuring and correcting the amount of mis-registration between first and second print heads of a digital printing machine without physical adjustment of the first and second print heads, the process comprising the steps of:
    (a) printing a calibration test page comprising a plurality of pairs of overlapping registration marks created by the first and second print heads; each of said pair of overlapping registration marks comprise a target region comprising X and Y co-ordinates;
    (b) scanning the calibration test page to produce a bitmap image;
    (c) processing said bitmap image to produce a mis-registration score for each of the target regions; said step of processing said bitmap image comprising the steps of: blurring the bit map image to produce a blurred bit map image; thresholding the blurred bitmap image to produce a binary black and white image; and selecting the target region within the binary black and white image having the least amount of black pixels as a selected target region indicative of the least amount of moire patterns and the best mis-registration score;
    (d) producing X and Y coordinate registration correction amounts corresponding to the co-ordinates of the selected target region;
    (e) adjusting the print data based upon the X and Y coordinate registration correction amounts to produce adjusted print data; and
    (f) sending the adjusted print data to the second print head.

2. The process of claim 1, wherein said step (a) comprises the step of building in an amount of mis-registration into each of the plurality of overlapping registration marks.

3. The process of claim 2, wherein said step (a) comprises the step of printing overlapping concentric circles.

4. The process of claim 3, wherein said step (a) comprises the step of printing overlapping concentric circles comprising a line thickness equal to one pixel.

5. The process of claim 4, wherein said step (a) comprises the step of printing overlapping concentric circles comprising a line spacing equal to one pixel.

* * * * *